United States Patent
Manghirmalani et al.

(10) Patent No.: US 9,769,065 B2
(45) Date of Patent: Sep. 19, 2017

(54) PACKET MARKING FOR L4-7 ADVANCED COUNTING AND MONITORING

(71) Applicant: Telefonaktiebolaget L M Ericsson (publ), Stockholm (SE)

(72) Inventors: Ravi Manghirmalani, Fremont, CA (US); Ming Xia, San Jose, CA (US); Heikki Mahkonen, San Jose, CA (US); Meral Shirazipour, San Jose, CA (US); Veronica Sanchez Vega, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 78 days.

(21) Appl. No.: 14/705,859

(22) Filed: May 6, 2015

(65) Prior Publication Data

US 2016/0330111 A1    Nov. 10, 2016

(51) Int. Cl.
*H04L 12/721* (2013.01)
*H04L 12/851* (2013.01)
(Continued)

(52) U.S. Cl.
CPC ............ *H04L 45/38* (2013.01); *H04L 43/028* (2013.01); *H04L 43/12* (2013.01);
(Continued)

(58) Field of Classification Search
None
See application file for complete search history.

(56) References Cited

U.S. PATENT DOCUMENTS

| 8,442,043 B2 | 5/2013 | Sharma et al. |
| 8,797,867 B1 * | 8/2014 | Chen ................... H04L 41/5022 370/232 |

(Continued)

FOREIGN PATENT DOCUMENTS

WO    2011079857 A1    7/2011

OTHER PUBLICATIONS

Halpern, et al. "Service Function Chaining (SFC) Architecture", IETF Standrads Track draft, Work in Progress, draft-ietf-sfc-architecture-05, retreived from the internet <http://tools.ietf.org/html/draft-ietf-sfc-architecture-05>, (Feb. 17, 2015), 27 pages.

(Continued)

*Primary Examiner* — Diane Lo
(74) *Attorney, Agent, or Firm* — Nicholson De Vos Webster & Elliot, LLP

(57) ABSTRACT

Exemplary methods for marking packets include in response to receiving a packet, determining whether the packet has been classified, and in response to determining the packet has not been classified, classifying the packet to determine a class to which the packet belongs, wherein the class identifies a set of zero or more markers that are to be included as part of packets belonging to the class. The methods include marking the packet with a first marker selected from the set of one or more markers, and forwarding the marked packet. Exemplary methods for processing markers include in response to receiving a packet, determining whether the packet has been marked with a marker, and in response to determining the packet has been marked with the first marker, performing a set of one or more operations required by the first marker.

24 Claims, 17 Drawing Sheets

(51) Int. Cl.
*H04L 12/833* (2013.01)
*H04L 29/06* (2006.01)
*H04L 12/26* (2006.01)

(52) U.S. Cl.
CPC .......... *H04L 47/2441* (2013.01); *H04L 47/31* (2013.01); *H04L 69/22* (2013.01); *H04L 43/08* (2013.01); *H04L 43/0811* (2013.01); *H04L 43/0829* (2013.01); *H04L 43/0852* (2013.01)

(56) References Cited

U.S. PATENT DOCUMENTS

| | | | |
|---|---|---|---|
| 2005/0135378 A1* | 6/2005 | Rabie | H04L 47/10 370/395.21 |
| 2008/0077705 A1 | 3/2008 | Li et al. | |
| 2008/0159233 A1* | 7/2008 | Achtari | H04L 45/121 370/332 |
| 2014/0293804 A1* | 10/2014 | Kakadia | H04L 41/145 370/252 |
| 2014/0334488 A1 | 11/2014 | Guichard et al. | |
| 2014/0362857 A1 | 12/2014 | Guichard et al. | |

OTHER PUBLICATIONS

IETF, "Service Function Chaining (sfc)," retreived from the internet on May 6, 2015, <https://datatracker.ietf.org/wg/sfc/charter/>, 4 pages.

Quinn, et al., "Network Service Header," Network Working Group Internet Draft, draft-ietf-sfc-nsh-00.txt, https://tools.ietf.org/html/draft-ietf-sfc-nsh-00, (Mar. 24, 2015), 42 pages.

Capello A., et al., "A packet based method for passive performance monitoring draft-tempia-opsawg-p3m-04.txt," Network Working Group, Feb. 13, 2014, 20 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       TLV Class       |c|    Type     |R|R|R|     Len         |
+-+-+-+-+-+-+-+-+-+-+-+-+-+-+-+-+-+-+-+-+-+-+-+-+-+-+-+-+-+-+-+-+
|                         Color 605                              |
+-+-+-+-+-+-+-+-+-+-+-+-+-+-+-+-+-+-+-+-+-+-+-+-+-+-+-+-+-+-+-+-+
|                        Interval 610                            |
+-+-+-+-+-+-+-+-+-+-+-+-+-+-+-+-+-+-+-+-+-+-+-+-+-+-+-+-+-+-+-+-+
```

Color Marker
600

FIG. 6

```
                                                    Timestamp Marker
                                                          700

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        TLV Class        |c|    Type     |        Len          |
+-+-+-+-+-+-+-+-+-+-+-+-+-+-+-+-+-+-+-+-+-+-+-+-+-+-+-+-+-+-+-+-+
|    Offset 705    |                                            |
+-+-+-+-+-+-+-+-+-+          Timestamps 710                     |
~                                                               ~
|                                                               |
+-+-+-+-+-+-+-+-+-+-+-+-+-+-+-+-+-+-+-+-+-+-+-+-+-+-+-+-+-+-+-+-+
```

FIG. 7

```
                                                    KPI Marker
                                                        800

0                   1                   2                   3
        0 1 2 3 4 5 6 7 8 9 0 1 2 3 4 5 6 7 8 9 0 1 2 3 4 5 6 7 8 9 0 1
       +-+-+-+-+-+-+-+-+-+-+-+-+-+-+-+-+-+-+-+-+-+-+-+-+-+-+-+-+-+-+-+-+
       |           TLV Class           |      Type     |R|R|R|   Len   |
       +-+-+-+-+-+-+-+-+-+-+-+-+-+-+-+-+-+-+-+-+-+-+-+-+-+-+-+-+-+-+-+-+
       |           KPI value (1 to 5 , 1 == Poor)  805                  |
       +-+-+-+-+-+-+-+-+-+-+-+-+-+-+-+-+-+-+-+-+-+-+-+-+-+-+-+-+-+-+-+-+
```

FIG. 8A

```
                                                    KPI Marker
                                                        801

0                   1                   2                   3
        0 1 2 3 4 5 6 7 8 9 0 1 2 3 4 5 6 7 8 9 0 1 2 3 4 5 6 7 8 9 0 1
       +-+-+-+-+-+-+-+-+-+-+-+-+-+-+-+-+-+-+-+-+-+-+-+-+-+-+-+-+-+-+-+-+
       |           TLV Class           |      Type     |R|R|R|   Len   |
       +-+-+-+-+-+-+-+-+-+-+-+-+-+-+-+-+-+-+-+-+-+-+-+-+-+-+-+-+-+-+-+-+
       |           KPI value (1 to 5 , 1 == Poor)  810                  |
       +-+-+-+-+-+-+-+-+-+-+-+-+-+-+-+-+-+-+-+-+-+-+-+-+-+-+-+-+-+-+-+-+
       |   Offset 815  |
       | +-+-+-+-+-+-+-+
       |                       Timestamps    820                        |
       ~                                                                ~
       +-+-+-+-+-+-+-+-+-+-+-+-+-+-+-+-+-+-+-+-+-+-+-+-+-+-+-+-+-+-+-+-+
```

FIG. 8B

```
                                                    Intercept Marker
                                                         900

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      TLV Class        |c|    Type     |R|R|R|     Len         |
+-+-+-+-+-+-+-+-+-+-+-+-+-+-+-+-+-+-+-+-+-+-+-+-+-+-+-+-+-+-+-+-+
|         Start  905            |         Stop  910             |
+-+-+-+-+-+-+-+-+-+-+-+-+-+-+-+-+-+-+-+-+-+-+-+-+-+-+-+-+-+-+-+-+
~                                                               ~
+-+-+-+-+-+-+-+-+-+-+-+-+-+-+-+-+-+-+-+-+-+-+-+-+-+-+-+-+-+-+-+-+
|         Start  906            |         Stop  911             |
+-+-+-+-+-+-+-+-+-+-+-+-+-+-+-+-+-+-+-+-+-+-+-+-+-+-+-+-+-+-+-+-+
```

FIG. 9

Network Troubleshooting With Markers

End-to-End Delay Measurement Using Markers

Transaction Troubleshooting

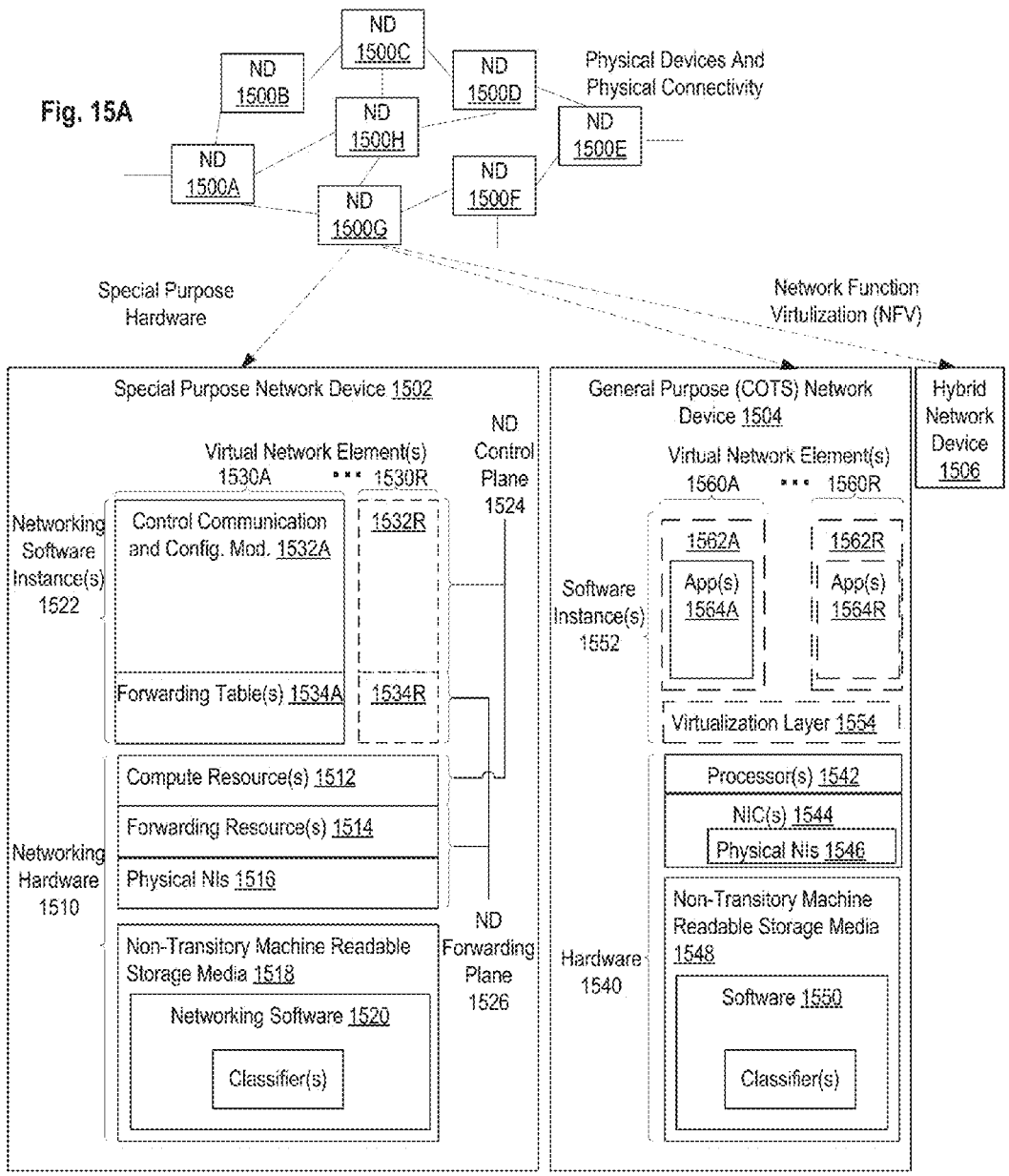

PACKET MARKING FOR L4-7 ADVANCED COUNTING AND MONITORING

FIELD

Embodiments of the invention relate to the field of packet networks, and more specifically, to packet marking for advanced counting and monitoring.

BACKGROUND

There are various reasons why network operators desire to measure traffic in their networks. Network measurement, for example, provides the data required for better network control, enabling the operator to characterize the state of the network, the traffic demands, and the actual consumption of network resources. Network measurement also enables trouble shooting or even prevent service-level agreement (SLA) violations before they occur.

With recent technological advancements such as Software-Defined Networking (SDN) and Network Function Virtualization (NFV), operators have coined the term "service chaining" to mean the differentiated forwarding of traffic flows across a policy defined set of middle boxes (also commonly referred to as services, inline services, appliances, network functions/vNFs in case of NFV, or Service Functions (SF)). Examples SFs include firewalls, content filters, Intrusion Detection Systems (IDS), Deep Packet Inspection (DPI), Network Address Translation (NAT), content caches, load-balancers, Wide Area Network (WAN) accelerators, multimedia transcoders, logging/metering/charging/advanced charging applications, etc.

Service chaining requires a classification process to forward packets on the correct service chain, followed by the differentiated forwarding/routing of the traffic flow across the right set of SFs or service function chain (SFC). Given the importance of this networking use case, the Internet Engineering Task Force (IETF) is developing protocols that will allow more efficient ways to implement SFCs. The IETF is even working on the definition of a Network Service Header (NSH) that will be applied to packets by the classifier. Then Service Function Forwarders (SFFs) will create the Service Function Paths (SFP) in the form of an overlay. IETF's solution is applicable to both physical Network Functions (NF) and virtual NFs (vNF) as defined by ETSI Network Functions Virtualization (NFV), referred to as SF in IETF.

A conventional approach for tracking packets that traverse the service chain includes a classifier (e.g., a Deep Packet Inspection (DPI) or Shallow Packet Inspection (SPI)) identifying the packet as belonging to a specific flow, wherein each flow is associated with a set of rules configured by a policy. The classifier then notifies a controller (e.g., a Software Defined Network (SDN) controller) each time a packet flow that matches the rule is observed. In that notification the classifier includes the flow information (e.g., 5 tuple packet header information). In response, the controller would have to program the switches (some or all) along the path of the flow to perform the appropriate type of counting/monitoring on packets with that flow information (e.g., 5 tuple). Such a conventional approach suffers the following limitations: 1) the controller would have to be aware of the path the flow will traverse; 2) there is a time between when the classifier identifies a flow, notifies the controller, and the controller programs the switches. During that time packets belonging to the flow are not monitored/counted. As a result the obtained measurement/monitoring information may be outdated or inaccurate; and 3) sending flow identification and notification to the controller generates control plane messaging. This sets a limit on how granular the counting/monitoring tasks can be.

SUMMARY

Exemplary methods for classifying and marking packets performed by a first network device, include in response to receiving a packet, determining whether the packet has been classified. The methods further include in response to determining the packet has not been classified, classifying the packet to determine a class to which the packet belongs, wherein the class identifies a set of zero or more markers that are to be included as part of packets belonging to the class. The methods further include marking the packet with a first marker selected from the set of one or more markers, and forwarding the marked packet.

According to one embodiment, the first marker includes a color of the packet and a time interval, the time interval indicating a frequency of when packets belonging to the class are marked with the first marker.

According to one embodiment, the first marker includes an offset value indicating a location in the first marker where a timestamp is to be inserted.

According to one embodiment, the methods further include marking the packet with a second marker selected from the set of one or more markers, wherein the second marker includes a key performance indicator (KPI) indicating whether the timestamp is to be inserted in the first marker at the location indicated by the offset value.

According to one embodiment, the first marker includes a start value indicating a first location in the packet and a stop value indicating a second location in the packet, wherein bytes in the packet that are between the first location and the second location are to be collected.

Exemplary methods for processing markers performed by a first network device, include in response to receiving a packet, determining whether the packet has been marked with a marker. The methods include determining the packet has been marked with a first marker, and in response to determining the packet has been marked with the first marker, performing a set of one or more operations required by the first marker.

According to one embodiment, the first marker includes an offset value indicating a location in the first marker where a timestamp is to be inserted, and wherein performing the set of one or more operations comprises inserting the timestamp in the first marker at the location indicated by the offset value.

According to one embodiment, performing the set of one or more operations further comprises updating the offset value by adding the offset value with a size of the inserted timestamp.

According to one embodiment, the methods further include determining the packet has been marked with a second marker that includes a key performance indicator (KPI) indicating whether the timestamp is to be inserted in the first marker at the location indicated by the offset value, and wherein performing the set of one or more operations further comprises determining to insert the timestamp in the first marker in response to determining the KPI indicates the timestamp is to be inserted.

According to one embodiment, the first marker includes a start value indicating a first location in the packet and a stop value indicating a second location in the packet, and wherein performing the set of one or more operations comprises collecting bytes in the packet that are between the first location and the second location.

BRIEF DESCRIPTION OF THE DRAWINGS

The invention may best be understood by referring to the following description and accompanying drawings that are used to illustrate embodiments of the invention. In the drawings:

FIG. 6 is a block diagram illustrating a color marker according to one embodiment.

FIG. 7 is a block diagram illustrating a timestamp marker according to one embodiment.

FIG. 8A is a block diagram illustrating a KPI marker according to one embodiment.

FIG. 8B is a block diagram illustrating a KPI marker according to one embodiment.

FIG. 9 is a block diagram illustrating an intercept marker according to one embodiment.

FIG. 15A illustrates connectivity between network devices (NDs) within an exemplary network, as well as three exemplary implementations of the NDs, according to some embodiments of the invention.

FIG. 15B illustrates an exemplary way to implement a special-purpose network device according to some embodiments of the invention.

DESCRIPTION OF EMBODIMENTS

Figure 1:
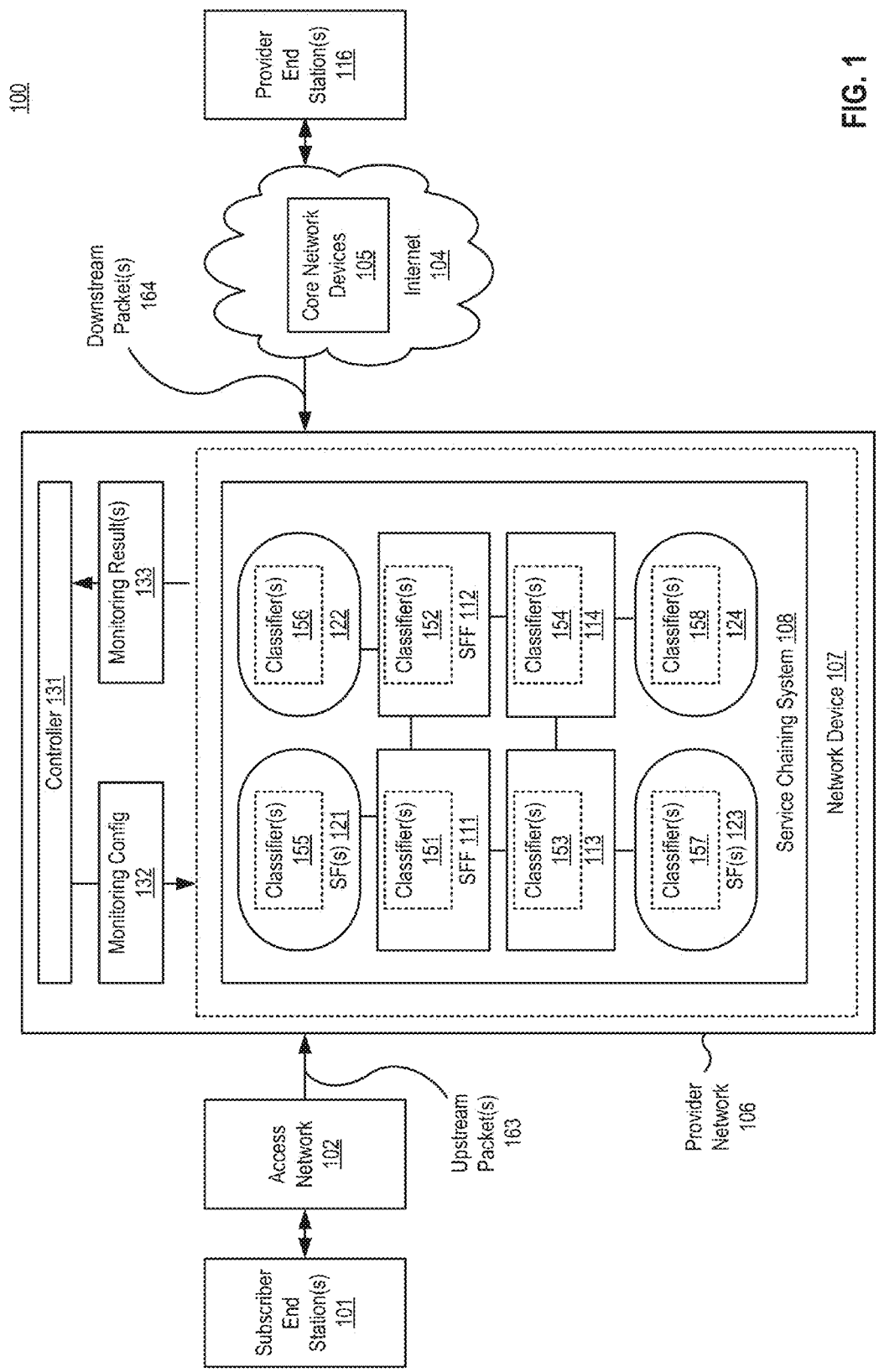
FIG. 1 is a block diagram illustrating a network according to one embodiment.

The following description describes methods and apparatus for marking packets. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a block diagram illustrating a network according to one embodiment. In the illustrated example, network 100 includes, but is not limited to, one or more subscriber end stations 101. Examples of suitable subscriber end stations include, but are not limited to, servers, workstations, laptops, netbooks, palm tops, mobile phones, smartphones, multimedia phones, tablets, phablets, Voice Over Internet Protocol (VOIP) phones, user equipment, terminals, portable media players, GPS units, gaming systems, set-top boxes, and combinations thereof. Subscriber end stations 101 access content/services provided over the Internet and/or content/services provided on virtual private networks (VPNs) overlaid on (e.g., tunneled through) the Internet. The content and/or services are typically provided by one or more provider end stations 116 (e.g., server end stations) belonging to a service or content provider. Examples of such content and/or services include, but are not limited to, public webpages (e.g., free content, store fronts, search services), private webpages (e.g., username/password accessed webpages providing email services), and/or corporate networks over VPNs, etc.

As illustrated, subscriber end stations 101 are communicatively coupled (e.g., through customer premise equipment) to access networks 102 (wired and/or wirelessly). Access networks 102 can be communicatively coupled to provider edge network devices (e.g., network device 107) of provider edge network 106. The provider edge network devices may be communicatively coupled through Internet 104 (e.g., through one or more core network devices 105) to one or more provider end stations 116 (e.g., server end stations). In some cases, the provider edge network devices of provider edge network 106 may host on the order of thousands to millions of wire line type and/or wireless subscriber end stations, although the scope of the invention is not limited to any known number.

Subscriber end stations 101 may transmit upstream packets 163 toward provider end stations 116. Provider end stations 116 may transmit downstream packets 164 toward subscriber end stations 101. Upstream packets 163 and/or downstream packets 164 may traverse provider edge network 106 and/or network device 107.

According to one embodiment, network 100 includes service chaining system (SC system) 108 for performing services on packets traversing provider network 106. In the illustrated example, SC system 108 includes service function forwarders (SFFs) 111-114. As used herein, a "SFF" refers to any module that is adapted or configured to forward packets to other SFF along a service function path (SFP). A SFF, for example, can forward packets along the SFP based on information contained in a forwarding information base (FIB) or an Open Flow table. According to one embodiment, each SFF is associated with one or more SFs. In the illustrated example, SFFs 111-114 are associated with SFs 121-124, respectively.

SFs 121-124 are adapted or configured to perform services on upstream packets 163 and/or downstream packets 164. Each SF can be implemented in software, firmware, hardware, or any combination thereof. In one embodiment, the SFs may provide advanced subscription based services or operations. Examples of suitable services include, but are not limited to, Deep Packet Inspection (DPI) services, Transparent Internet Caching (TIC) services, Content Delivery Network (CDN) services, Network Address Translation (NAT) services. Other examples of suitable services include, but are not limited to, parental control services, Internet Protocol Security (IPSec) services, firewall services, WAN (wireless area network) optimization services, and profiling and flow tracking services. According to one embodiment, application of these services to subscriber traffic may be determined at least in part based on subscription policies (e.g., payment plans) associated with the subscribers or subscriber end stations. For example, one subscriber may desire the service of SF 121, whereas another subscriber may desire to pay for the service of 122. In some aspects, these subscription policies may be included in the subscriber records or attributes associated with the subscribers or subscriber end stations.

According to one embodiment, at each ingress and egress point of each SFF and/or SF, monitoring resources such as probes are available for performing network measurements. A probe can be, for example, a counter. Each probe is associated with a cost and a rule, which can either be its own dedicated rule or a rule of the SFP to which the probe belongs. A rule defines a condition for when the corresponding probe is to be updated (e.g., incremented, decremented, etc.). According to one embodiment, each rule (whether it be a dedicated rule or an SFP rule) can be up to 5 tuple (e.g., source Internet Protocol (IP) address, destination IP address, source port, destination port, and protocol identifier (ID)).

According to one embodiment, each of SFF's 111-114 and/or each of SFs 121-124 may include one or more classifiers, which can be implemented in software, firmware, hardware, or any combination thereof. In the illustrated embodiment, SFFs 111-114 and SFs 121-124 include classifiers 151-158, respectively. According to one embodiment, in response to receiving a packet (e.g., an Internet Protocol (IP) packet), a classifier is configured or adapted to determine whether the packet belongs to an already identified/classified flow. If the packet belongs to a flow that has not been previously classified, then the classifier is to classify the flow of the packet (e.g., by using the 5 tuple) to determine the class to which the flow belongs. In one embodiment, each class may identify a set of one or more markers. According to one embodiment, the classifier then marks the packet with the marker(s) identified by the class to which the packet belongs. As used herein, "marking" the packet refers to including the marker(s) as part of the packet. In one embodiment, the classifier includes the marker(s) as part of the packet by inserting the marker(s) at a predetermined location in the packet. In one such embodiment, the classifier marks the packet by appending the marker(s) to the packet. In another embodiment, the classifier marks the packet by prepending the marker(s) to the packet. The marked packet is then forwarded to the next node in the network, which can be another SFF or another SF within the same SFF.

According to one embodiment, in response to receiving a packet, a classifier is configured or adapted to determine whether the packet has been previously marked with marker(s). In response to determining the packet is marked, the classifier is to process each marker and perform the operations required by the marker(s). Once all markers are processed, the packet is forwarded to the next node in the network, which can be another SFF or another SF within the same SFF.

It should be noted that each classifier is configured with its own class configuration. Thus, as a packet traverses from one classifier to another, the class configuration associated with each classifier may cause different operations or markers to be marked on the packet. By way of example, when a packet enters SC system 108 at an ingress node, the classifier at the ingress node may be associated with a class configuration that requires a first type of marker to be marked on the packet. The marked packet is then sent to the next node. The class configuration of the classifier at the next node may require the classifier to re-mark the packet with another marker. As used herein, "re-marking" the packet refers to removing the markers that were included as part of the received packet, and marking the packet with new markers that are identified by the local class configuration.

Provider network 106 includes controller 131 (e.g., a SDN controller or a Network Management System (NMS)) that is communicatively coupled to SC system 108. Controller 131 may send monitoring and/or class configurations 132 (herein referred to simply as "configurations") to one or more of classifiers 151-158. Configurations 132 includes class configuration (e.g., information that enables each classifier to classify the flows to classes, and the markers that are associated with each class). In this way, controller 131 is able to configure each of classifiers 151-152 with its own class configuration. According to one embodiment, controller 131 receives monitoring results 133 from one or more of classifiers 151-158. Monitoring results 133 may include, for example, the results of the operations performed by classifiers 151-158 when processing the markers. In one embodiment, controller 131 polls classifiers 151-158 for monitoring results 133. Alternatively, or in addition to, controller 131 may configure classifiers 151-158 to automatically send monitoring results 133 to controller 131 upon the occurrence of some predetermined conditions.

Throughout the description, references are made to controller 131 configuring classifiers 151-158 with information (e.g., class configuration) on how to mark the packets. It should be noted that such configuration may also be performed by one or more of the classifiers. By way of example, controller 131 may configure a classifier of an ingress node with the information. The classifier can then include such configuration information in the packet (e.g., as part of a dedicated marker) before sending the packet to the next node. In response to receiving the packet, the next node can then read the configuration information included in the packet and store it locally. One having ordinary skill in the art would recognize that other mechanisms can be implemented for configuring classifiers 151-158 (e.g., by an operator via a command line interface (CLI)).

According to one embodiment, the various modules of SC system 108 can be implemented as part of one network device. For example, SFFs 111-114 and SFs 121-124 may be implemented as part of network device 107. In an alternative embodiment, the various modules of SC system 108 can be implemented as virtual machines that are executed on one or more network devices. In such an embodiment, the various virtualized modules of SC system 108 that are distributed among different network devices communicate with other using tunneling mechanisms (e.g., Virtual Extensible LAN (VxLAN)). Virtual machines are described in further details below. Embodiments of the present invention shall now be described in greater details through the description of various other figures below.

Figure 2:
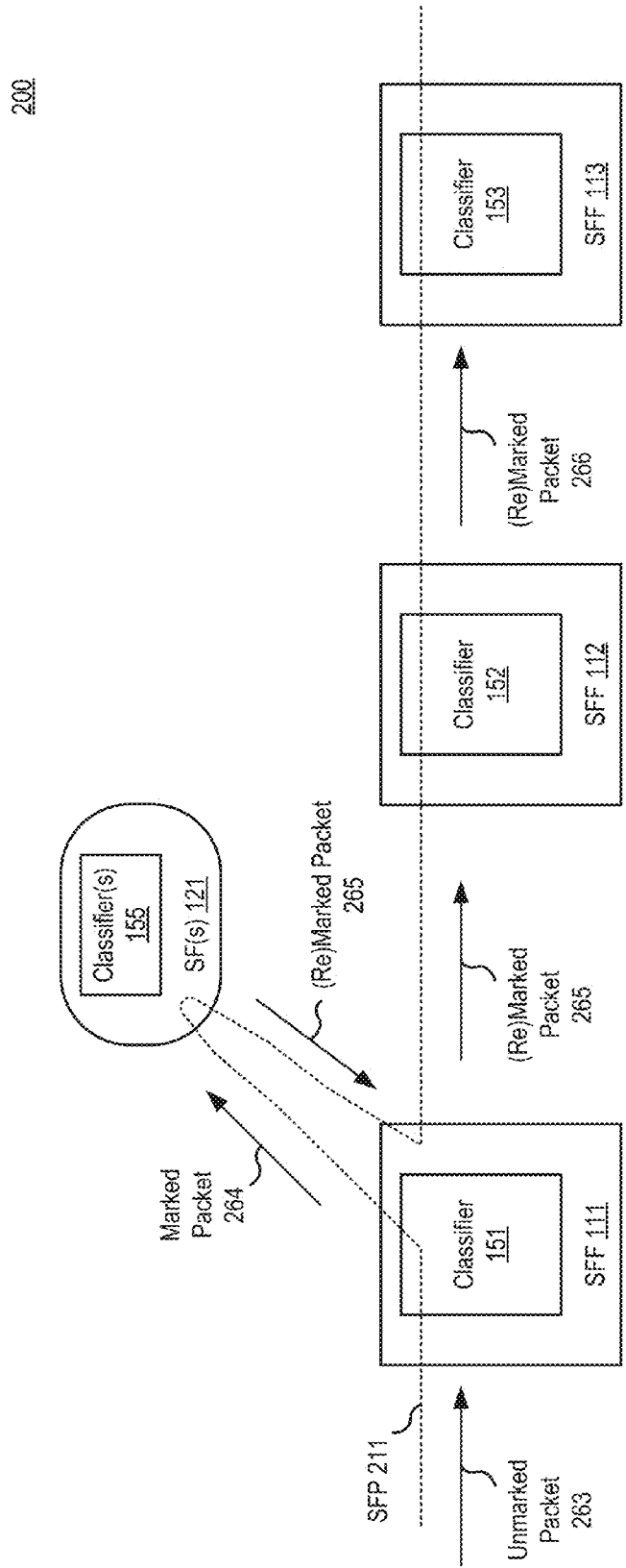
FIG. 2 is a block diagram illustrating a network according to one embodiment.

FIG. 2 is a block diagram illustrating a network according to one embodiment. Network 200 is similar to network 100 illustrated in FIG. 1. In order to avoid obscuring the invention, however, certain details have been omitted in FIG. 2. Certain other details, however, have been added to FIG. 2 in order to better illustrate the invention. In the example illustrated in FIG. 2, Service Function Path (SFP) 211 has been created to carry traffic that matches the rule SrcIP@ 129.192.172.0/8. In other words, SFP 211 carries all traffic that originates from a source having an IP address of 129.192.172.0/8 (e.g., traffic belonging to Ericsson N.J. (NJ)). SFP 211 comprises the following segments between: 1) SFF 111 and SF 121, 2) SF 121 and SFF 111, 3) SFF 111 and SFF 112, and 4) SFF 112 and SFF 113. In this example, classifiers 151-153 have been installed at SFFs 111-113, respectively, and classifier 155 has been installed at SF 121, for processing packets that traverse SFP 211.

FIG. 2 illustrates classifier 151 receives unmarked packet 263. Classifier 151 classifies (if it has not been previously classified) and marks packet 263 based on its class configuration. Classifier 151 then forwards the marked packet as marked packet 164 to classifier 155. Classifier 155 receives marked packet 264, detects the markers, and perform the operations required by the markers. Classifier 155 may (depending on its local class configuration) re-mark the packet prior to forwarding it back to SFF 111 as (re)marked packet 265. SFF 111 forwards (re)marked packet 265 to SFF 112. Classifier 152 of SFF 112 detects the markers and perform the operations required by the markers. Classifier 152 may (depending on its local class configuration) re-mark the packet prior to forwarding it to SFF 113 as (re)marked packet 266.

Figure 3:
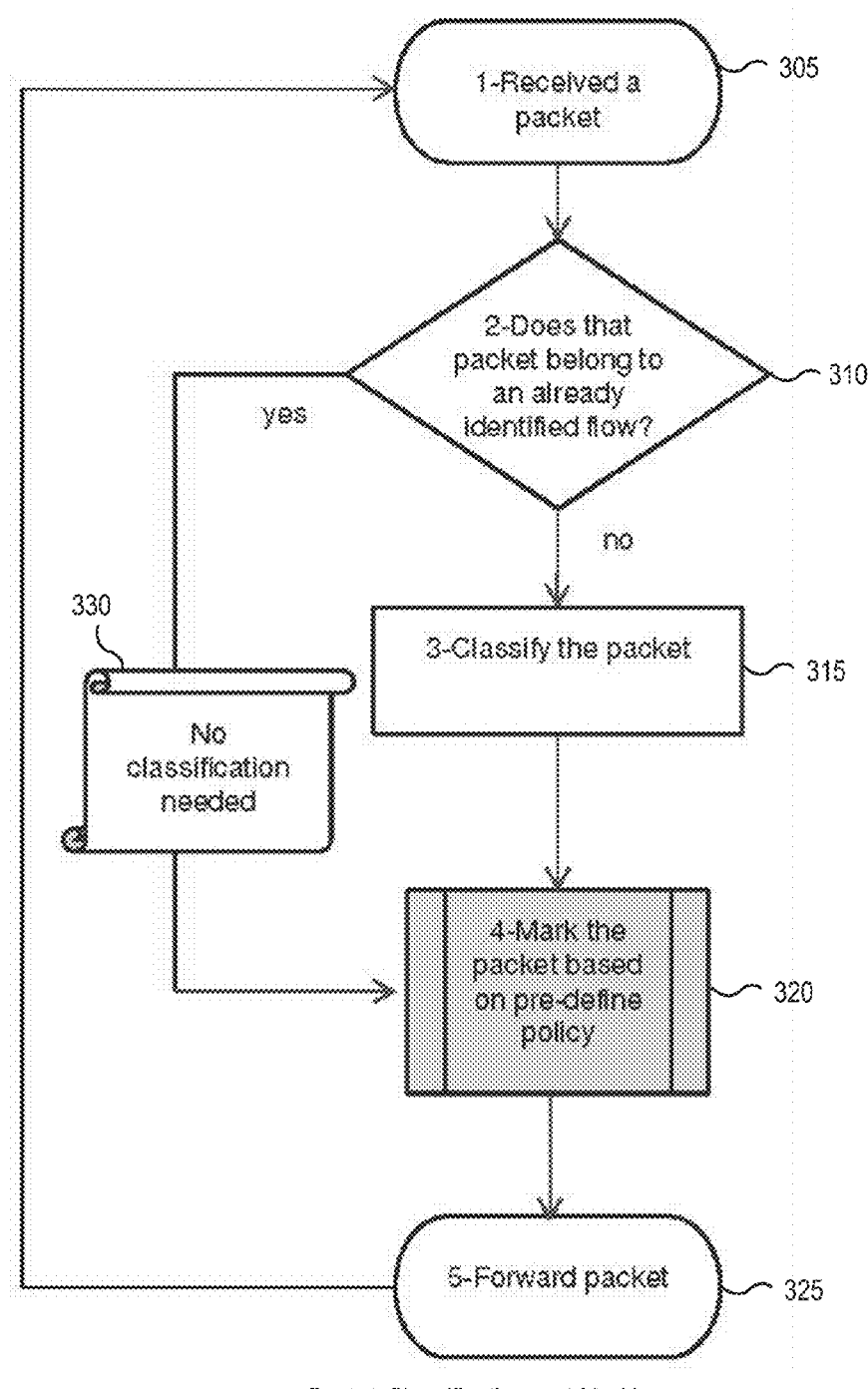
FIG. 3 is a flow diagram illustrating a method for performing packet classification and marking according to one embodiment.

FIG. 3 is a flow diagram illustrating a method for performing packet classification and marking according to one embodiment. For example, method 300 can be performed by any of classifiers 151-158. Method 300 can be implemented in software, firmware, hardware, or any combination thereof. The operations in the following flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams. FIG. 3 shall be discussed with reference to FIG. 2.

Referring now to FIG. 3, at block 305 a classifier receives a packet. For example, classifier 151 receives unmarked packet 263. At block 310, the classifier determines whether the packet belongs to an already identified/classified flow. For example, the classifier may use header information (e.g., the 5 tuple) of the packet to lookup a storage unit (e.g., a cache) to determine if the header information already exists in the storage unit. In response to determining the header information of the packet does not exist in the storage unit, the classifier determines that the flow to which the packet belongs has not been classified. Alternatively, in response to determining the header information of the packet does exist in the storage unit, the classifier determines that the flow has been classified.

At block 315 (the "No" branch of block 310), the classifier classifies the packet, and updates the storage unit with the classification results. In this way, the next packet that is received which belongs to the same flow will not require the classifier to re-perform the classification process. The classifier functionality can be realized using Layer 2 (L2) to Layer 7 (L7) information. Shallow packet inspection (SPI) typically uses L2-4 information for classification purposes. Deep Packet Inspection (DPI) commonly utilizes L2-7 information for classification purposes. DPI may also use heuristics or signature based techniques to perform classification. The result of a classification process is that the flow (e.g., identified by the 5 tuple) is mapped to a predefined class, wherein a class is associated with a rule/policy/configuration (e.g., all of employee x's traffic between his laptop & YouTube). In one embodiment, the class configuration also identifies one or more markers that are to be marked on packets that belong to the flow that is mapped to the class.

At block 320, the classifier marks the packet based on the class policy/configuration. For example, the class configuration may identify one or more markers that the classifier is required to mark the packet with. If so, the classifier is to mark the packet with the identified markers. At block 325, once the packet has been marked, the SFF or SF associated with the classifier forwards the marked packet to the next node, which can be a SFF or SF. For example, once classifier 151 has completed marking unmarked packet 263, SFF 111 forwards it as marked packet 264 to SF 121. Continuing on with the example, SF 121 performs its service function on marked packet 264. Classifier 155 of SF 121 also process the markers included as part of marked packet 264 (described below), and returns the serviced packet back to SFF 111. At block 330 (the "Yes" branch of block 310), the classifier does not perform classification, and proceeds directly to block 320 to perform packet marking as described above.

Figure 4:
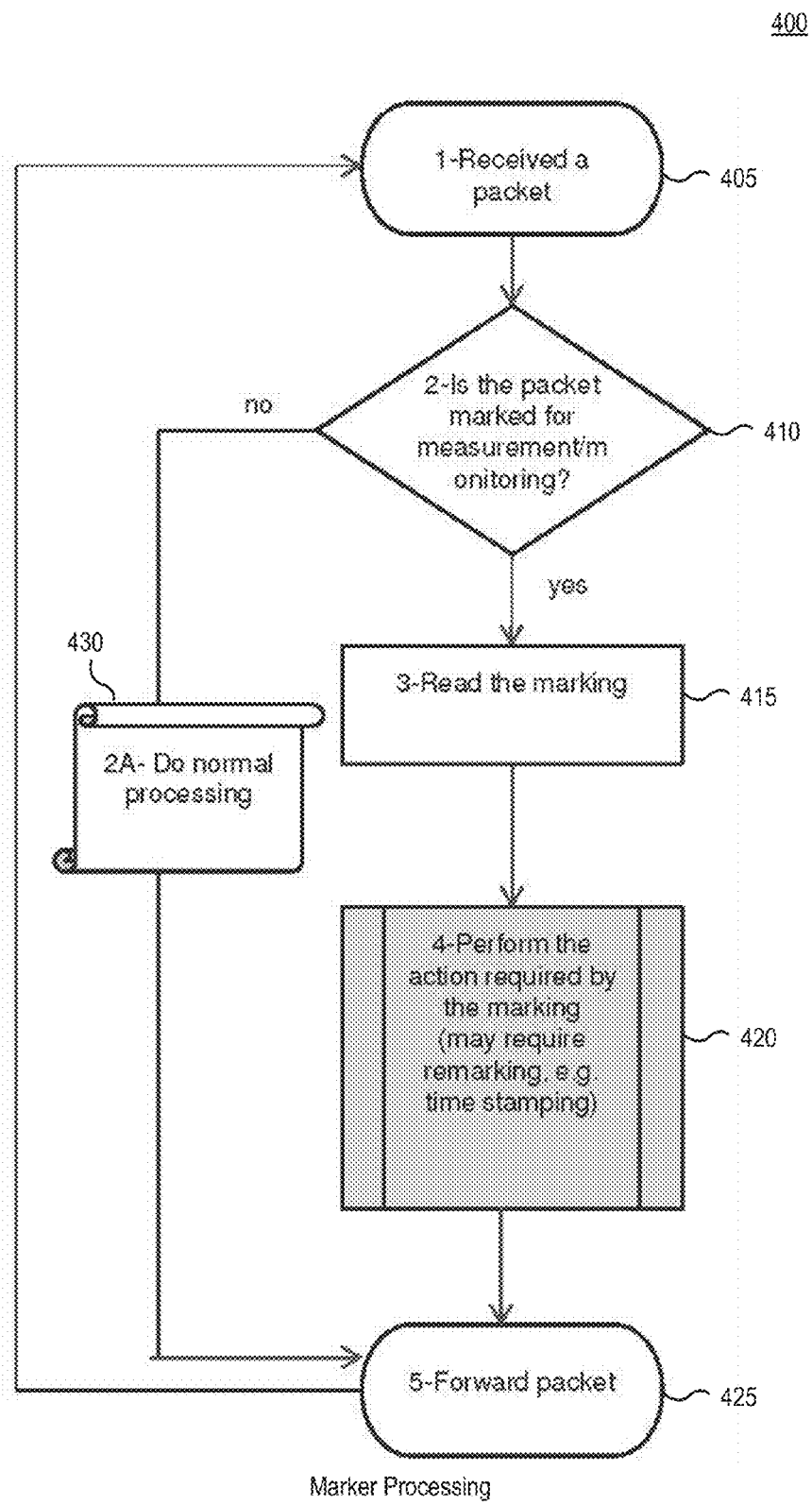
FIG. 4 is a flow diagram illustrating a method for processing markers according to one embodiment.

FIG. 4 is a flow diagram illustrating a method for processing markers according to one embodiment. For example, method 400 can be performed by any of classifiers 151-158. Method 400 can be implemented in software, firmware, hardware, or any combination thereof. FIG. 4 shall be discussed with reference to FIG. 2. Referring now to FIG. 4, at block 405 a classifier receives a packet. For example, classifier 155 receives marked packet 264 from SFF 111.

At block 410, the classifier determines whether the packet is marked for measurement and/or monitoring. For example, classifier 155 determines whether marked packet 264 includes one or more markers. At block 415 (the "Yes" branch of block 410), the classifier reads/processes the marker(s). At block 420, the classifier performs one or more operations required by the marker(s). It should be noted that the class configuration may require the classifier to re-mark the packet (e.g., by removing the marker(s) that are included in the received packet, and re-marking the packet with one or more markers identified by its class configuration). Thus, after classifier 155 has completed processing the markers, SF 121 may forward a re-marked version of packet 264.

At block 425, once the markers have been processed and the required operations have been performed, the SFF or SF associated with the classifier forwards the marked (or re-marked) packet to the next node. For example, once classifier 155 has completed processing the marker(s), SF 121 forwards marked (or re-marked) packet 265 to SFF 111. At block 430 (the "No" branch of block 410), the classifier performs normal processing of the packet without performing any measurement or monitoring.

Throughout the description, references are made to markers. As used herein, a "marker" refers to a collection of one or more bytes, the encoding of which specifies the operations that are to be performed by the recipient of the marked packet. A marker, for example, can be a header (comprising of one or more fields) that is encapsulated on the packet. In one example, a marker can be implemented as an extension of the Network Service Header (NSH) as described by draft-ietf-sfc-nsh-00.txt (which is hereby incorporated by reference). It should be understood, however, that a marker can be implemented using any other format without departing from the broader scope and spirit of the present invention.

Figure 5A:
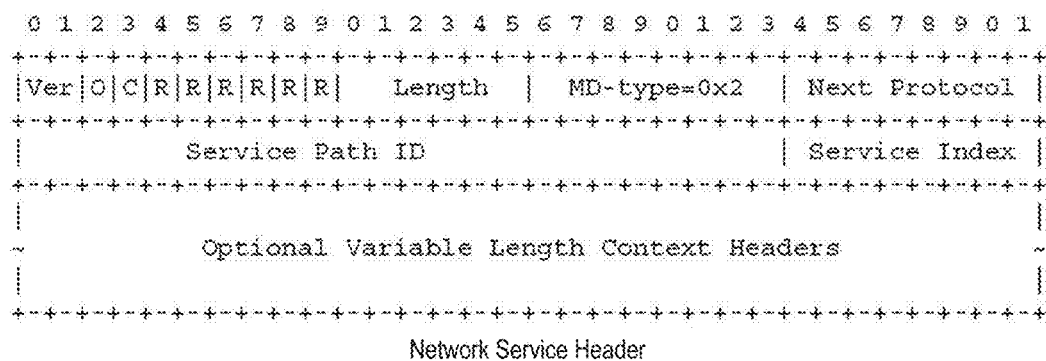
FIG. 5A is a block diagram illustrating a NSH as defined by draft-ietf-sfc-nsh-00.txt.

FIG. 5A is a block diagram illustrating a NSH as defined by draft-ietf-sfc-nsh-00.txt. The various fields of the NSH are described in great details in draft-ietf-sfc-nsh-00.txt. For the sake of brevity, they will not be described here. Each NSH includes an optional variable length context header, the format of which is illustrated in FIG. 5B.

Figure 5B:
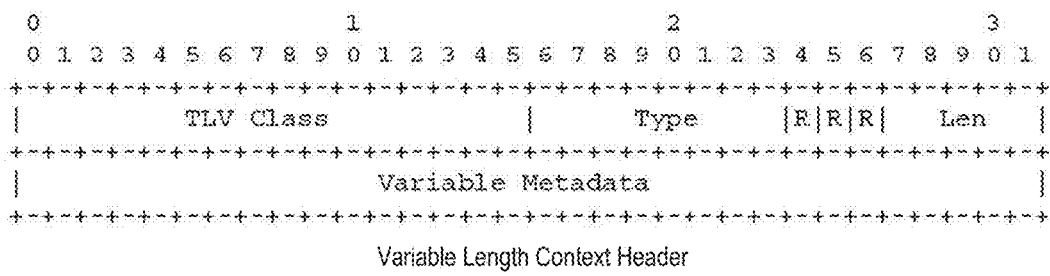
FIG. 5B is a block diagram illustrating a variable length context header.

FIG. 5B is a block diagram illustrating a variable length context header. The Type field includes a value/encoding that defines the type of metadata that is included in the variable length context header. Each variable length context header includes a field that contains variable metadata. In various embodiments of the present invention, the markers are implemented as variable length context headers.

According to one embodiment, a color marker includes a color of the packet. The color marker, in one embodiment, may also include an optional time interval indicating a frequency of when packets belonging to the class are marked with the color marker. For example, if the classifier marks the packet belonging to the class with a color green every 100 milliseconds (ms), then the time interval would indicate a value of 100 ms. In one embodiment, the color marker is implemented as an extension of the variable length context header of the NSH header defined by draft-ietf-sfc-nsh-00.txt, as illustrated in FIG. 6.

FIG. 6 is a block diagram illustrating a color marker according to one embodiment. For example, a new "Type" value/encoding can be defined to indicate the variable length context header is a color marker that includes color 605 and time interval 610. In such an embodiment, color 605 includes the color of the marked packet, and time interval 610 includes a time interval indicating a frequency of when packets belonging to the class are marked with color marker 600.

According to one embodiment, a timestamp marker includes an offset value and one or more timestamps that have been inserted into the timestamp marker. The offset value indicates a location in the marker where the next timestamp is to be inserted by the recipient of the marked packet. In one embodiment, the timestamp marker is implemented as an extension of the variable length context header of the NSH header defined by draft-ietf-sfc-nsh-00.txt, as illustrated in FIG. 7.

FIG. 7 is a block diagram illustrating a timestamp marker according to one embodiment. For example, a new "Type" value/encoding can be defined to indicate the variable length context header is a timestamp marker that includes offset 705 and timestamps 710. In one such embodiment, offset 705 includes an offset value indicating where the next timestamp is to be inserted in timestamp marker 700 by the recipient of the marked packet. Timestamps 710 represent the timestamps that have been inserted into timestamp marker 700. For example, the offset value may be set to a value of 0 by the first classifier. The next classifier that detects the marker will insert a timestamp at a location that is 0 bytes away from a predetermined location (e.g., the end of offset 705) in the marker. Thus, when offset 705 includes a value of 0, in this example, the first recipient of the marked packet will insert a timestamp at a location that is 0 bytes after offset 705. In one embodiment, in addition to inserting the timestamp, the classifier which inserted the timestamp is also configured to update the value in offset 705 by adding the offset value with a value corresponding to the size of the inserted timestamp. Continuing on with the above example, if the inserted timestamp is 4-byte wide, then the updated value in offset 705 is 4 (assuming offset 705 has a unit of bytes). In this way, when the next classifier receives the marked packet, it will insert its timestamp immediately after the first timestamp.

In one embodiment, when a classifier detects an offset value that is greater than the length of the timestamp marker, the classifier is to not insert a timestamp. In another embodiment, the classifier is to reset the offset value back to a predetermined value (e.g., 0) and insert the timestamp at that location (and update the offset value by the size of the inserted timestamp). According to one embodiment, when a classifier detects an offset value that is greater than the length of the timestamp marker, the classifier is to notify a predetermined controller. For example, the classifier can send the notification as part of monitoring results 133 to controller 131.

According to one embodiment, in response to receiving a packet that is marked with a timestamp marker, a classifier is to insert a timestamp of when the marked packet was received. In another embodiment, the recipient classifier is to insert a timestamp of when the marked packet is forwarded to the next node. In yet another embodiment, the recipient classifier is to insert both a timestamp of when the marked packet was received and a timestamp of when the marked packet is forwarded to the next node. It should be noted that in such an embodiment, the value in offset 705 is to be updated by adding the value with the value corresponding the size of 2 timestamps.

According to one embodiment, a key performance indicator (KPI) marker includes a KPI value indicating a performance of the flow to which the marked packet belongs. For example, the KPI value may have a value in the range of 1 to 5, wherein a value of 1 indicates the flow has a "poor" performance. Other conventions, however, can be implemented. Further, it should be understood that the KPI value may be implemented with other ranges. In one embodiment, the KPI marker is implemented as an extension of the variable length context header of the NSH header defined by draft-ietf-sfc-nsh-00.txt, as illustrated in FIGS. 8A and 8B.

FIG. 8A is a block diagram illustrating a KPI marker according to one embodiment. For example, a new "Type" value/encoding can be defined to indicate the variable length context header is a KPI marker that includes KPI value 805. In one such embodiment, KPI value 805 includes a value indicating the performance of the flow to which the marked packet belongs. According to one embodiment, when a classifier marks a packet with KPI marker 800, the classifier also marks the packet with a timestamp marker, such as, for example, timestamp marker 700. In one such embodiment, when a classifier receives a packet marked with KPI marker 800, and KPI value 805 indicates the flow has a "poor" performance, the classifier is to insert a timestamp in the timestamp marker as described above. When a classifier receives a packet marked with KPI marker 800, and KPI value 805 does not indicate the flow has a "poor" performance, the classifier is to not insert a timestamp.

FIG. 8B is a block diagram illustrating a KPI marker according to one embodiment. For example, a new "Type" value/encoding can be defined to indicate the variable length context header is a KPI marker that includes KPI value 810, offset 815, and timestamps 820. In one such embodiment, KPI value 810 includes a value indicating the performance of the flow to which the marked packet belongs. The definitions of offset 815 and timestamps 820 are as described above with respect to timestamp marker 700. In one embodiment, when a classifier receives a packet marked with KPI marker 801, and KPI value 810 indicates the flow has a "poor" performance, the classifier is to insert a timestamp in timestamps 820 at a location indicated by offset 815. When a classifier receives a packet marked with KPI marker 801, and KPI value 810 does not indicate the flow has a "poor" performance, the classifier is to not insert a timestamp.

In one embodiment, a classifier (e.g., a classifier at the end of a SFP) may be configured to forward the timestamps that are included in a timestamp marker or a KPI marker to a predetermined controller. For example, the classifier can forward the timestamps as part of monitoring results 133 to controller 131. In one such embodiment, the classifier is to forward the timestamps at one or more preconfigured conditions (e.g., every N number of packets, every M time interval (e.g., milliseconds/seconds, etc.), when the flow is deactivated, etc.). Alternatively, or in addition to, the controller can poll the classifier for the timestamps. For example, controller 131 can poll the classifier for the timestamps as part of monitoring results 133.

According to one embodiment, an intercept marker includes a set of one or more start values and a corresponding set of one or more stop values. Each pair of start value and corresponding stop value identifies a range of bytes in the marked packet that the recipient classifier is to "intercept" (i.e., collect). The start values and end values are referenced to a predetermined location in the marked packet. In one embodiment, the start/stop values are referenced to the beginning of the packet including the encapsulated markers (i.e., the reference point is the beginning of the marker(s) that have been prepended to the packet). In another embodiment, the start/stop values are referenced to the beginning of the packet excluding the encapsulated markers (i.e., the reference point is immediately after the marker(s) that have been prepended to the packet). In one embodiment, the intercept marker is implemented as an extension of the variable length context header of the NSH header defined by draft-ietf-sfc-nsh-00.txt, as illustrated in FIG. 9.

FIG. 9 is a block diagram illustrating an intercept marker according to one embodiment. For example, a new "Type" value/encoding can be defined to indicate the variable length context header is an intercept marker that includes a set of one or more start values and a corresponding set of one or more stop values. In the illustrated example, intercept marker 900 includes start value 905 corresponding to stop value 910, and start value 906 corresponding to stop value 911. By way of example, assume start value 905, stop value 910, start value 906, and stop value 911 include the values 0, 8, 12, and 20, respectively, and further assuming these values are referenced to the beginning of the packet excluding the markers. When a classifier receives such a marker, the classifier is to collect the bytes starting from byte location 0 of the packet to byte location 8, and the bytes starting from byte location 12 of the packet to byte location 20.

In one embodiment, the classifier is configured to forward the collected bytes to a predetermined controller. For example, the classifier can forward the collected bytes as part of monitoring results 133 to controller 131. In one such embodiment, the classifier is to forward the collected bytes at one or more preconfigured conditions (e.g., every N number of packets, every M time interval (e.g., milliseconds/seconds, etc.), when the flow is deactivated, etc.). Alternatively, or in addition to, the controller can poll the classifier for the collected bytes. For example, controller 131 can poll the classifier for the collected bytes as part of monitoring results 133.

The markers described herein are intended for illustrative purposes, and not intended to be limitations of the present invention. One having ordinary skill in the art would recognize that various other markers can be implemented to collect various other metadata. By way of example, embodiments of the present classifiers can be configured to support markers for collecting buffer occupancy experienced by the node (e.g., SFF and/or SF) or experienced by the flow to which the marked packet belongs. As used herein, "buffer occupancy" refers to a number representing a percentage of the available buffer that is utilized.

Embodiments of the present classifiers can also be configured to support markers for collecting the number of hops traversed by the marked packet. In one such embodiment, the number of hops includes SFs. In another embodiment, the number of hops does not include SFs. Embodiments of the present classifiers can also be configured to support markers for collecting node identifiers (IDs) of each node (e.g., SFF and/or SF) that is traversed by the marked packet. Embodiments of the present classifiers can also be configured to support markers for collecting system information/resources (e.g., central processing unit (CPU) utilization, memory, operating system version, system clock stamp, etc.). Embodiments of the present classifiers can also be configured to support markers for collecting information/statistics computed by the SFF or SF (e.g., information concerning jitter, packet loss, etc.). In one such embodiment, the classifier may be configured to collect information only if a preconfigured threshold has been exceeded. For example, the classifier may be configured to insert the packet loss information in the marker only if the packet loss has exceeded the preconfigured threshold.

It should be understood that these various other markers described above can be implemented using header formats that are similar to those described throughout the description.

Throughout the description, various markers are described for collecting metadata. In one embodiment, to collect multiple types of metadata, the packet is marked with multiple markers. For example, to collect timestamps and bytes from the packet, a classifier may be configured (via the class configuration) to mark the packet with a timestamp marker and an intercept marker. It should be understood that the various markers described herein can also be combined in any combination thereof (e.g., as illustrated by KPI marker 801) to collect multiple types of metadata. By way of example, the timestamp marker can be combined with the intercept marker to collect timestamps and bytes from the packet.

Various methods for performing network monitoring using embodiments of the present classifiers shall now be described.

Using Color Markers for Monitoring Connectivity and Packet Loss

According to one embodiment, packet coloring can be used to form a band for measurement of a flow train. This band can be formed for time period during which associated counting/monitoring would take place. Various flow parameters (e.g., connectivity, loss, delay, latency, jitter, volume, etc.) can be accounted for during the time interval when the packets are in the flow train. The controller (e.g., controller 131) is aware of the topology of the measurement domain and the order of traversal of the packet. The controller informs the intension to the classifier at the ingress node for monitoring by configuring the ingress node with the flow definition (e.g., 5-tuple, OpenFlow match criteria, or DPI L4-L7 classification definition), the monitoring parameter (e.g., connectivity, loss, delay, latency, jitter, volume, bandwidth, etc.), the ordered set of intermediate service nodes of interest, and the egress collection point of interest.

The function of the ingress classifier is first identify/classify the flow and then mark the flow using markers to signal the type of monitoring operation (start/continue/stop) at the points of interest. Depending on the nature of the operation, the intermediate nodes would record any desired parameter (counter, timestamp, etc.). The egress node collects the information. The controller can poll the egress node periodically to retrieve the intermediate results or the egress node can periodically push that information to the controller. Either the ingress or egress nodes could be programmed to signal the controller of any explicit indication of flow termination or inactivity of the monitored flow.

In the case of monitoring connectivity, the ingress classifier marks a packet of the flow and informs the controller of the marking. In response to detecting the marked packet, the egress classifier informs the controller. If the controller receives no response within a predetermined interval (e.g., maximum lifetime of the packet in the network), the packet is considered lost. Obviously, only flows destined to the egress should be considered for marking and packets, which could be consumed or dropped by an intermediate node, should not be marked.

In the case of monitoring packet loss, the ingress classifier marks all packets of the flow for a predetermined duration of time. The ingress classifier informs the controller of the number of packets in the flow train that were marked. The controller correlates this number with the counter from the egress node to determine the loss rate.

Using Color Markers for Measuring Jitter

A typical monitoring-as-a-service (MaaS) task may be monitoring end-to-end jitter performance for a specified flow throughout the network (e.g., Voice over IP (VoIP) flow). When jitter of a portion of packets exceeds a certain threshold, MaaS system could alert the network operator and/or trigger network optimization (e.g. traffic engineering).

However, if jitter violation detection is based on the absolute jitter metric, this would require end-to-end packet delay measurement. Delay measurement requires either 1) time stamping the packets of interest and conveying such information in the packet, or 2) identifying the same packet at the source and destination to determine their arrival time. In either case, network time synchronization will be needed for desired level of measurement accuracy, and the effort for packet delay measurement is substantial.

The above limitations can be overcome by using packet marking mechanisms of the present invention. The key idea is to mark packets to record their relative position (arrival time), and decode the order of markers to expose jitter violation. Packets in a flow of interest can be marked at the source node. Markers can be encoded into different "colors", and a number of colors can be selected to mark a certain flow.

Figure 10:
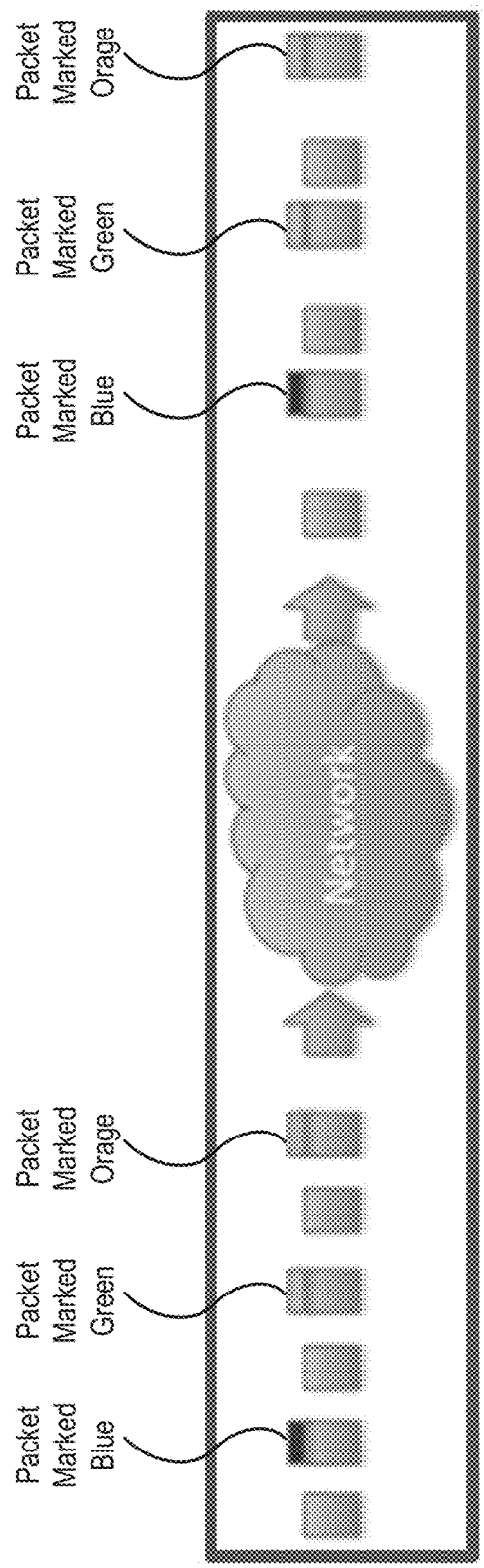
FIG. 10 is a block diagram illustrating a mechanism for performing network troubleshooting according to one embodiment.

The order of the colors used for each marked packet in a flow represent the relative departure order of the packets in the flow. For example, when packets are serially marked as "orange", "green", and "blue" (see FIG. 10), this order of color markers should be preserved during the transmission in an ideal network state.

During the marking process at the source node, there are two general requirements: 1) two consecutively marked packets should have different colors; and 2) the time interval of marking packets with the same color is the same and specified in the policy. It is not necessary to mark each packet, i.e., unmarked packets are allowed between two consecutively marked packets. The interval of two consecutively marked packets is determined by the monitoring granularity and the jitter requirement.

At the destination node, the color markers will be extracted for each marked packet. The relative order of the markers will be validated to ensure jitter does not exceed the predetermined threshold. Given that the interval of two consecutively marked packets is determined based on jitter threshold, a mis-order will signify a jitter violation.

Using Intercept Markers for Load Balancing

Figure 11:
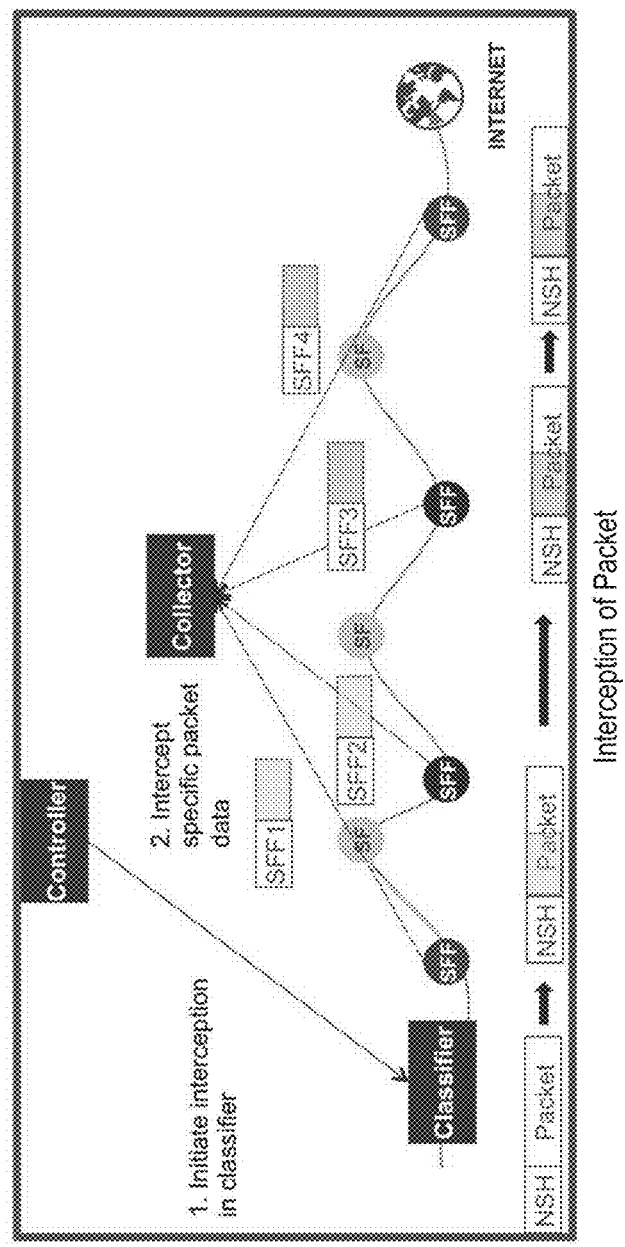
FIG. 11 is a block diagram illustrating a mechanism for performing load balancing according to one embodiment.

FIG. 11 is a block diagram illustrating a mechanism for performing load balancing according to one embodiment. As illustrated in FIG. 11, a controller (e.g., controller 131) can configure a packet classifier to mark a packet with an intercept marker, indicating what portions of the encapsulated packet need to be collected along the path. When a classifier at a SFF and/or SF detects the intercept marker, it collects the bytes (as required by the intercept marker) from the marked packet. The collected bytes are then forwarded, sent, mirrored to a collector and/or database. The controller can configure the target of the intercepted data for each individual node. When a SFF sends/stores the collected bytes, it is to include the SFF identifier, timestamp, and fingerprint of the data (e.g., NSH service path ID, TLV class, etc.) with the bytes.

Using Color Markers for Determining a Root Cause of a Problem

Figure 12:
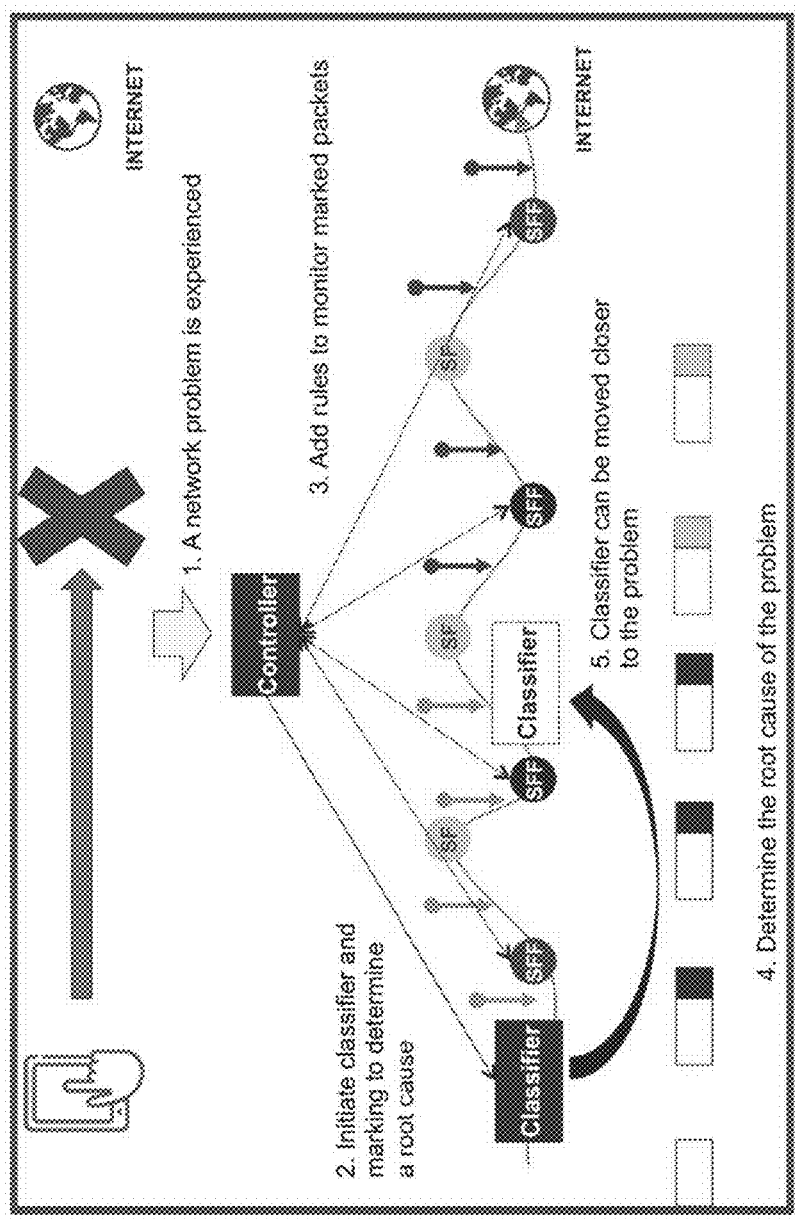
FIG. 12 is a block diagram illustrating a mechanism for determining a root cause of missing or improperly routed packets.

FIG. 12 is a block diagram illustrating a mechanism for determining a root cause of missing or improperly routed packets. At operation 1, a network problem is observed, which triggers the troubleshooting process. At operation 2, a controller (e.g., controller 131) configures the classifiers along the SFP to mark the packets. The controller has global visibility of the SFPs and can determine optimal place to orchestrate the classifier functionality. In addition, the controller can determine packet classifying rules to capture individual application flows or groups of application flows (e.g., wildcarding 5-tuple).

At operation 3, in addition to configuring the classifiers to perform packet marking, the controller installs probing rules on forwarding elements to track/detect the markings. At operation 4, the controller determines where in the network the problem is located through the monitoring of the added probing rules. At operation 5, if necessary, the classifier can be moved in different places of the network and the controller can filter flows by issuing narrower packet classifying rules to the classifier. For example this can be achieved by deploying the classifier at certain point(s) along the SFP. Once the location of the root cause of the problem is identified the controller removes packet classifier and probing rules.

Using Timestamp Markers for Measuring End-to-End Delay

Figure 13:
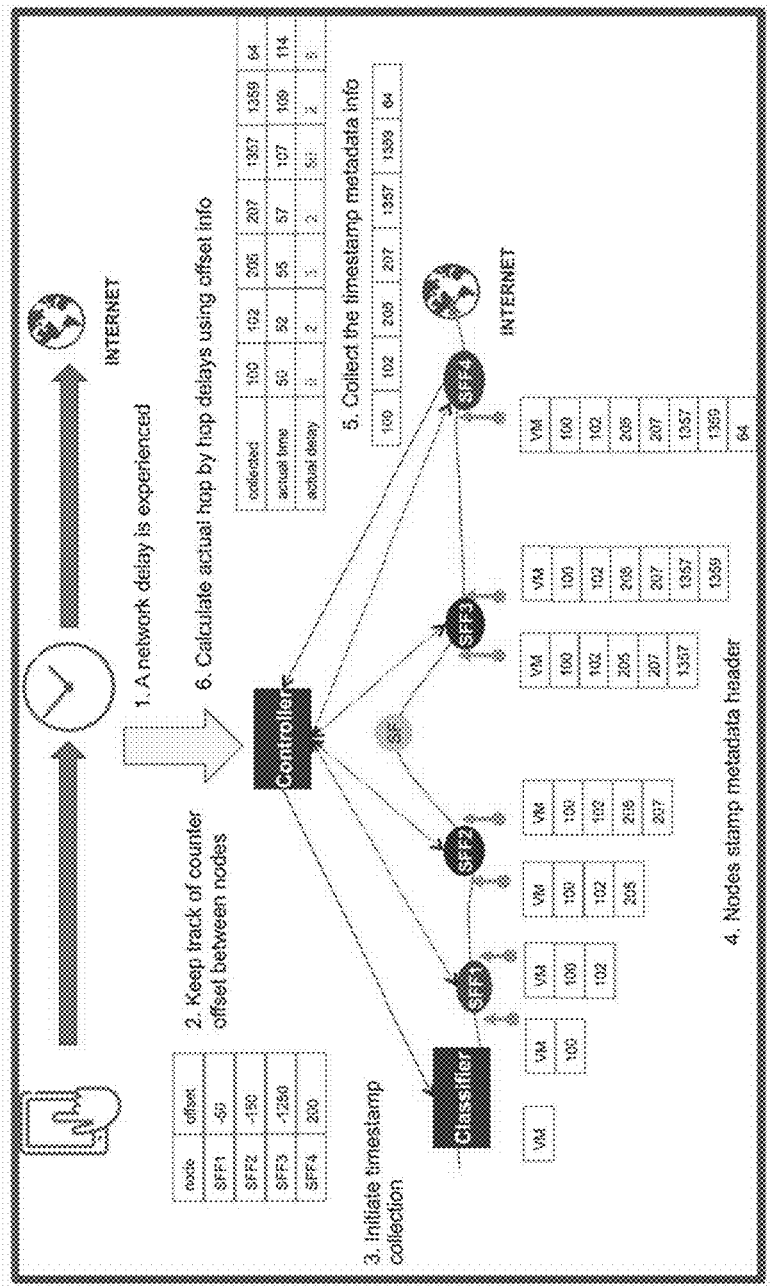
FIG. 13 is a block diagram illustrating a mechanism for determining End-to-End delay according to one embodiment.

FIG. 13 is a block diagram illustrating a mechanism for determining End-to-End delay according to one embodiment. At operation 1, a network delay is observed, triggering the troubleshooting process. The goal of this scenario is to isolate the root cause of the delay and to be able to use this information to optimize SFPs through orchestration.

At operation 2, to be able to correctly calculate delays on the flow path the controller keeps track of clock offsets of the SFFs and SFs that it is controlling. The clocks do not need to be synchronized between all network elements, but the controller needs to know the offset in each network element. Extensions to communication protocol (e.g. OpenFlow, Netconf) between the controller and the SFFs and SFs are needed to acquire this information.

At operation 3, the controller (e.g., controller 131) initiates the timestamp collection process by signaling a classifier to mark packets with a timestamp marker. The controller also configures the classifiers to collect the gathered timestamps and relay the information back to the controller for analysis.

At operation 4, the classifiers which detect the markers are configured to insert the timestamps into the timestamp markers. At operation 5, the controller collects the gathered timestamps for analysis. At operation 6, the controller is aware of the network topology and the path of the packet that collected the timestamps and uses this knowledge to parse the timestamps added by each SFF or SF. Together with SFF and SF clock offset information, the controller can extract the delay introduced by each of the network sections, SFFs and SFs.

Using KPI Markers for Assisting Application Transaction Troubleshooting

Figure 14:
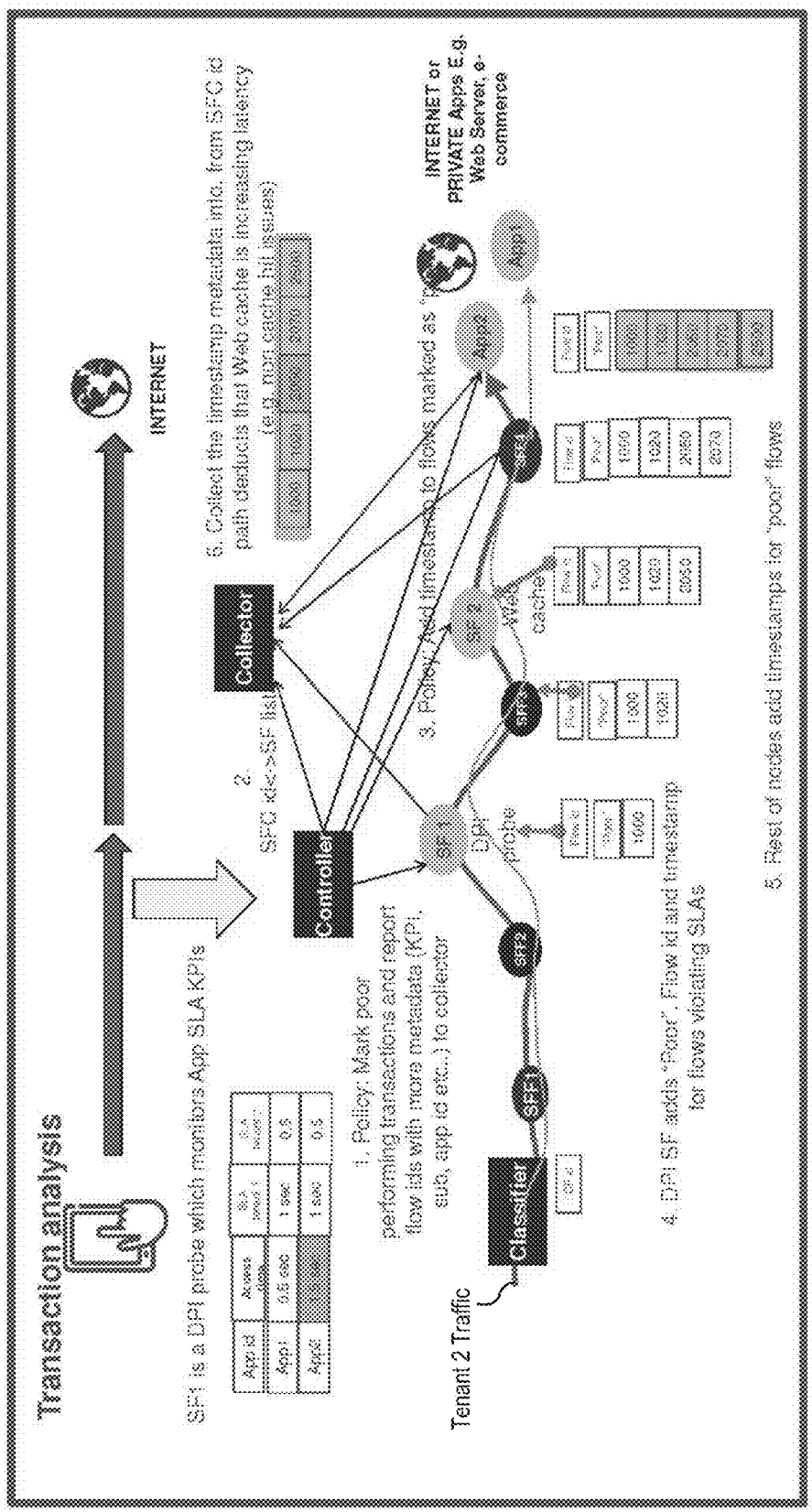
FIG. 14 is a block diagram illustrating a mechanism for assisting application transaction troubleshooting according to one embodiment.

FIG. 14 is a block diagram illustrating a mechanism for assisting application transaction troubleshooting according to one embodiment. In one embodiment, the classifier which has the functionality of a DPI probe can mark the packets with KPI markers at the ingress. In one embodiment, a L4-L7 Service Function which monitors Application performance (e.g., a DPI probe) is configured to mark transactions subject to "poor performance" so additional measurements can be enabled in the nodes involved in the service path of that transaction.

According to such an embodiment, a classifier (e.g., a DPI probe shown as SF1 in FIG. 14) is configured by the controller with a policy (which can be tenant/subscriber based) to mark transactions towards applications which do not meet the Service Level Agreement (SLA) threshold, with the KPI markers. For example, if the average web access time for tenant 2 is below the SLA threshold (e.g., 0.5 sec), then the classifier is to mark the packets of that flow as having a poor performance by inserting "Poor" in the KPI value of the KPI marker. The classifier also marks the packet with a flow ID marker, wherein the flow ID marker includes information identifying the flow which is having a poor performance. Another policy could be to mark video flows which are having more than N number of video freezes. Depending on the use case not all the packets need to be marked.

In one embodiment, the controller also configures a policy in the service chain forwarders and certain SFs to add troubleshooting markers (e.g., timestamp markers, system resource markers, etc.) such that when a classifier detects the KPI marker with the KPI value set to "poor", the classifier inserts the metadata (e.g., timestamp, CPU utilization, memory, etc.) into the corresponding markers.

In one embodiment, one or more of the classifiers (e.g., DPI probes) send detailed information about the poor performing transactions (e.g., flow id, Service KPI values, user and business data to a collector for further analysis). At the end of the SFP, the classifier (e.g., SFF4 in FIG. 14) sends measurements to a flow collector based on the accumulated troubleshooting metadata and the SFC path id. Alternatively, the classifier directly mirrors such packets.

In this example, the collector/analytics tool uses the SFC path id from the flows and the SFC/SF configuration obtained from the controller to identify the SF order of metadata insertion and determines that the main contributor to the delay is the Web cache Service Function SF2. In addition the collector/analytics tool correlates the delay information with the information reported by the classifier via the flow id (e.g., deducing that only the web transactions to a given Uniform Resource Locator (URL) are suffering delay, inferring that probable cause is cache misses).

FIG. 15A illustrates connectivity between network devices (NDs) within an exemplary network, as well as three exemplary implementations of the NDs, according to some embodiments of the invention. FIG. 15A shows NDs 1500A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 1500A, E, and F illustrates that these NDs act as ingress and egress points for the network (and thus, these NDs are sometimes referred to as edge NDs; while the other NDs may be called core NDs).

Two of the exemplary ND implementations in FIG. 15A are: 1) a special-purpose network device 1502 that uses custom application—specific integrated—circuits (ASICs) and a proprietary operating system (OS); and 2) a general purpose network device 1504 that uses common off-the-shelf (COTS) processors and a standard OS.

The special-purpose network device 1502 includes networking hardware 1510 comprising compute resource(s) 1512 (which typically include a set of one or more processors), forwarding resource(s) 1514 (which typically include one or more ASICs and/or network processors), and physical network interfaces (NIs) 1516 (sometimes called physical ports), as well as non-transitory machine readable storage media 1518 having stored therein networking software 1520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 1500A-H. During operation, the networking software 1520 may be executed by the networking hardware 1510 to instantiate a set of one or more networking software instance(s) 1522. Each of the networking software instance(s) 1522, and that part of the networking hardware 1510 that executes that network software instance (be it hardware dedicated to that networking software instance and/or time slices of hardware temporally shared by that networking software instance with others of the networking software instance(s) 1522), form a separate virtual network element 1530A-R. Each of the virtual network element(s) (VNEs) 1530A-R includes a control communication and configuration module 1532A-R (sometimes referred to as a local control module or control communication module) and forwarding table(s) 1534A-R, such that a given virtual network element (e.g., 1530A) includes the control communication and configuration module (e.g., 1532A), a set of one or more forwarding table(s) (e.g., 1534A), and that portion of the networking hardware 1510 that executes the virtual network element (e.g., 1530A).

Software 1520 can include code which when executed by networking hardware 1510, causes networking hardware 1510 to perform operations of one or more embodiments of the present invention as part networking software instances 1522.

The special-purpose network device 1502 is often physically and/or logically considered to include: 1) a ND control plane 1524 (sometimes referred to as a control plane) comprising the compute resource(s) 1512 that execute the control communication and configuration module(s) 1532A-R; and 2) a ND forwarding plane 1526 (sometimes referred to as a forwarding plane, a data plane, or a media plane) comprising the forwarding resource(s) 1514 that utilize the forwarding table(s) 1534A-R and the physical NIs 1516. By way of example, where the ND is a router (or is implementing routing functionality), the ND control plane 1524 (the compute resource(s) 1512 executing the control communication and configuration module(s) 1532A-R) is typically responsible for participating in controlling how data (e.g., packets) is to be routed (e.g., the next hop for the data and the outgoing physical NI for that data) and storing that routing information in the forwarding table(s) 1534A-R, and the ND forwarding plane 1526 is responsible for receiving that data on the physical NIs 1516 and forwarding that data out the appropriate ones of the physical NIs 1516 based on the forwarding table(s) 1534A-R.

FIG. 15B illustrates an exemplary way to implement the special-purpose network device 1502 according to some embodiments of the invention. FIG. 15B shows a special-purpose network device including cards 1538 (typically hot pluggable). While in some embodiments the cards 1538 are of two types (one or more that operate as the ND forwarding plane 1526 (sometimes called line cards), and one or more that operate to implement the ND control plane 1524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1536 (e.g., a first full mesh coupling the line cards and a second full mesh coupling all of the cards).

Returning to FIG. 15A, the general purpose network device 1504 includes hardware 1540 comprising a set of one or more processor(s) 1542 (which are often COTS processors) and network interface controller(s) 1544 (NICs; also known as network interface cards) (which include physical NIs 1546), as well as non-transitory machine readable storage media 1548 having stored therein software 1550. During operation, the processor(s) 1542 execute the software 1550 to instantiate one or more sets of one or more applications 1564A-R. While one embodiment does not implement virtualization, alternative embodiments may use different forms of virtualization—represented by a virtualization layer 1554 and software containers 1562A-R. For example, one such alternative embodiment implements operating system-level virtualization, in which case the virtualization layer 1554 represents the kernel of an operating system (or a shim executing on a base operating system) that allows for the creation of multiple software containers 1562A-R that may each be used to execute one of the sets of applications 1564A-R. In this embodiment, the multiple software containers 1562A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 1554 represents a hypervisor (sometimes referred to as a virtual machine monitor (VMM)) or a hypervisor executing on top of a host operating system; and 2) the software containers 1562A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 1564A-R, as well as the virtualization layer 1554 and software containers 1562A-R if implemented, are collectively referred to as software instance(s) 1552. Each set of applications 1564A-R, corresponding software container 1562A-R if implemented, and that part of the hardware 1540 that executes them (be it hardware dedicated to that execution and/or time slices of hardware temporally shared by software containers 1562A-R), forms a separate virtual network element(s) 1560A-R.

The virtual network element(s) 1560A-R perform similar functionality to the virtual network element(s) 1530A-R—e.g., similar to the control communication and configuration module(s) 1532A and forwarding table(s) 1534A (this virtualization of the hardware 1540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 1562A-R differently. For example, while embodiments of the invention are illustrated with each software container 1562A-R corresponding to one VNE 1560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 1562A-R to VNEs also apply to embodiments where such a finer level of granularity is used.

In certain embodiments, the virtualization layer 1554 includes a virtual switch that provides similar forwarding services as a physical Ethernet switch. Specifically, this virtual switch forwards traffic between software containers 1562A-R and the NIC(s) 1544, as well as optionally between the software containers 1562A-R; in addition, this virtual switch may enforce network isolation between the VNEs 1560A-R that by policy are not permitted to communicate with each other (e.g., by honoring virtual local area networks (VLANs)).

Software 1550 can include code which when executed by processor(s) 1542, cause processor(s) 1542 to perform operations of one or more embodiments of the present invention as part software containers 1562A-R.

The third exemplary ND implementation in FIG. 15A is a hybrid network device 1506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 1502) could provide for para-virtualization to the networking hardware present in the hybrid network device 1506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1530A-R, VNEs 1560A-R, and those in the hybrid network device 1506) receives data on the physical NIs (e.g., 1516, 1546) and forwards that data out the appropriate ones of the physical NIs (e.g., 1516, 1546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 15C:
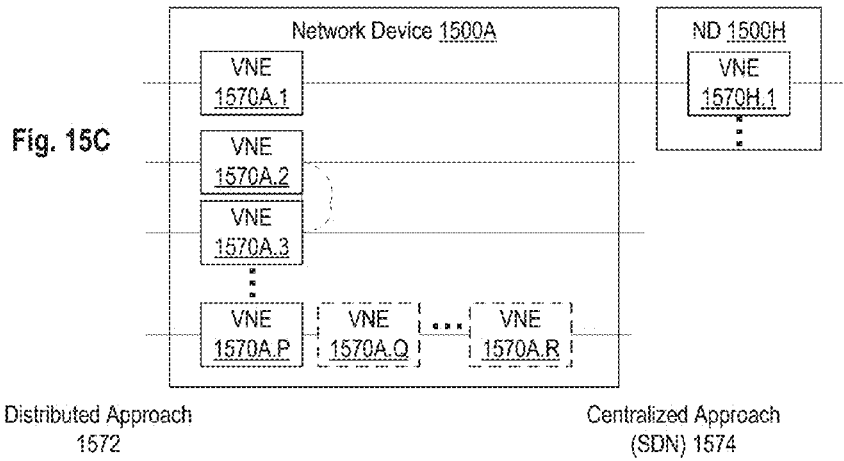
FIG. 15C illustrates various exemplary ways in which virtual network elements (VNEs) may be coupled according to some embodiments of the invention.

FIG. 15C illustrates various exemplary ways in which VNEs may be coupled according to some embodiments of the invention. FIG. 15C shows VNEs 1570A.1-1570A.P (and optionally VNEs 1570A.Q-1570A.R) implemented in ND 1500A and VNE 1570H.1 in ND 1500H. In FIG. 15C, VNEs 1570A.1-P are separate from each other in the sense that they can receive packets from outside ND 1500A and forward packets outside of ND 1500A; VNE 1570A.1 is coupled with VNE 1570H.1, and thus they communicate packets between their respective NDs; VNE 1570A.2-1570A.3 may optionally forward packets between themselves without forwarding them outside of the ND 1500A; and VNE 1570A.P may optionally be the first in a chain of VNEs that includes VNE 1570A.Q followed by VNE 1570A.R (this is sometimes referred to as dynamic service chaining, where each of the VNEs in the series of VNEs provides a different service—e.g., one or more layer 4-7 network services). While FIG. 15C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 15A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 15A may also host one or more such servers (e.g., in the case of the general purpose network device 1504, one or more of the software containers 1562A-R may operate as servers; the same would be true for the hybrid network device 1506; in the case of the special-purpose network device 1502, one or more such servers could also be run on a virtualization layer executed by the compute resource(s) 1512); in which case the servers are said to be co-located with the VNEs of that ND.

A virtual network is a logical abstraction of a physical network (such as that in FIG. 15A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 15D:
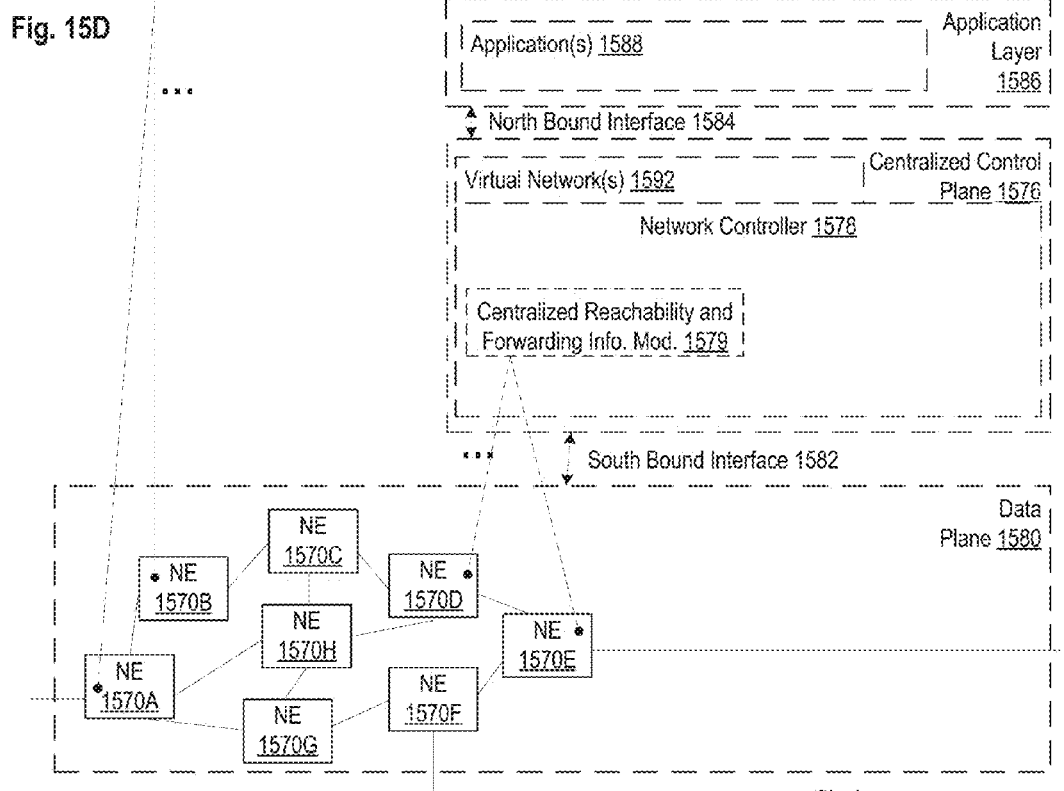
FIG. 15D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 15D illustrates a network with a single network element on each of the NDs of FIG. 15A, and within this straight forward approach contrasts a traditional distributed approach (commonly used by traditional routers) with a centralized approach for maintaining reachability and forwarding information (also called network control), according to some embodiments of the invention. Specifically, FIG. 15D illustrates network elements (NEs) 1570A-H with the same connectivity as the NDs 1500A-H of FIG. 15A.

FIG. 15D illustrates that the distributed approach 1572 distributes responsibility for generating the reachability and forwarding information across the NEs 1570A-H; in other words, the process of neighbor discovery and topology discovery is distributed.

For example, where the special-purpose network device 1502 is used, the control communication and configuration module(s) 1532A-R of the ND control plane 1524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 1570A-H (e.g., the compute resource(s) 1512 executing the control communication and configuration module(s) 1532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1524.

The ND control plane 1524 programs the ND forwarding plane 1526 with information (e.g., adjacency and route information) based on the routing structure(s). For example, the ND control plane 1524 programs the adjacency and route information into one or more forwarding table(s) 1534A-R (e.g., Forwarding Information Base (FIB), Label Forwarding Information Base (LFIB), and one or more adjacency structures) on the ND forwarding plane 1526. For layer 2 forwarding, the ND can store one or more bridging tables that are used to forward data based on the layer 2 information in that data. While the above example uses the special-purpose network device 1502, the same distributed approach 1572 can be implemented on the general purpose network device 1504 and the hybrid network device 1506.

FIG. 15D illustrates that a centralized approach 1574 (also known as software defined networking (SDN)) that decouples the system that makes decisions about where traffic is sent from the underlying systems that forwards traffic to the selected destination. The illustrated centralized approach 1574 has the responsibility for the generation of reachability and forwarding information in a centralized control plane 1576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1576 has a south bound interface 1582 with a data plane 1580 (sometime referred to the infrastructure layer, network forwarding plane, or forwarding plane (which should not be confused with a ND forwarding plane)) that includes the NEs 1570A-H (sometimes referred to as switches, forwarding elements, data plane elements, or nodes). The centralized control plane 1576 includes a network controller 1578, which includes a centralized reachability and forwarding information module 1579 that determines the reachability within the network and distributes the forwarding information to the NEs 1570A-H of the data plane 1580 over the south bound interface 1582 (which may use the OpenFlow protocol). Thus, the network intelligence is centralized in the centralized control plane 1576 executing on electronic devices that are typically separate from the NDs.

For example, where the special-purpose network device 1502 is used in the data plane 1580, each of the control communication and configuration module(s) 1532A-R of the ND control plane 1524 typically include a control agent that provides the VNE side of the south bound interface 1582. In this case, the ND control plane 1524 (the compute resource(s) 1512 executing the control communication and configuration module(s) 1532A-R) performs its responsibility for participating in controlling how data (e.g., packets) is to be routed (e.g., the next hop for the data and the outgoing physical NI for that data) through the control agent communicating with the centralized control plane 1576 to receive the forwarding information (and in some cases, the reachability information) from the centralized reachability and forwarding information module 1579 (it should be understood that in some embodiments of the invention, the control communication and configuration module(s) 1532A-R, in addition to communicating with the centralized control plane 1576, may also play some role in determining reachability and/or calculating forwarding information—albeit less so than in the case of a distributed approach; such embodiments are generally considered to fall under the centralized approach 1574, but may also be considered a hybrid approach).

While the above example uses the special-purpose network device 1502, the same centralized approach 1574 can be implemented with the general purpose network device 1504 (e.g., each of the VNE 1560A-R performs its responsibility for controlling how data (e.g., packets) is to be routed (e.g., the next hop for the data and the outgoing physical NI for that data) by communicating with the centralized control plane 1576 to receive the forwarding information (and in some cases, the reachability information) from the centralized reachability and forwarding information module 1579; it should be understood that in some embodiments of the invention, the VNEs 1560A-R, in addition to communicating with the centralized control plane 1576, may also play some role in determining reachability and/or calculating forwarding information—albeit less so than in the case of a distributed approach) and the hybrid network device 1506. In fact, the use of SDN techniques can enhance the NFV techniques typically used in the general purpose network device 1504 or hybrid network device 1506 implementations as NFV is able to support SDN by providing an infrastructure upon which the SDN software can be run, and NFV and SDN both aim to make use of commodity server hardware and physical switches.

FIG. 15D also shows that the centralized control plane 1576 has a north bound interface 1584 to an application layer 1586, in which resides application(s) 1588. The centralized control plane 1576 has the ability to form virtual networks 1592 (sometimes referred to as a logical forwarding plane, network services, or overlay networks (with the NEs 1570A-H of the data plane 1580 being the underlay network)) for the application(s) 1588. Thus, the centralized control plane 1576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 15D shows the distributed approach 1572 separate from the centralized approach 1574, the effort of network control may be distributed differently or the two combined in certain embodiments of the invention. For example: 1) embodiments may generally use the centralized approach (SDN) 1574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1574, but may also be considered a hybrid approach.

While FIG. 15D illustrates the simple case where each of the NDs 1500A-H implements a single NE 1570A-H, it should be understood that the network control approaches described with reference to FIG. 15D also work for networks where one or more of the NDs 1500A-H implement multiple VNEs (e.g., VNEs 1530A-R, VNEs 1560A-R, those in the hybrid network device 1506). Alternatively or in addition, the network controller 1578 may also emulate the implementation of multiple VNEs in a single ND. Specifically, instead of (or in addition to) implementing multiple VNEs in a single ND, the network controller 1578 may present the implementation of a VNE/NE in a single ND as multiple VNEs in the virtual networks 1592 (all in the same one of the virtual network(s) 1592, each in different ones of the virtual network(s) 1592, or some combination). For example, the network controller 1578 may cause an ND to implement a single VNE (a NE) in the underlay network, and then logically divide up the resources of that NE within the centralized control plane 1576 to present different VNEs in the virtual network(s) 1592 (where these different VNEs in the overlay networks are sharing the resources of the single VNE/NE implementation on the ND in the underlay network).

Figure 15E:
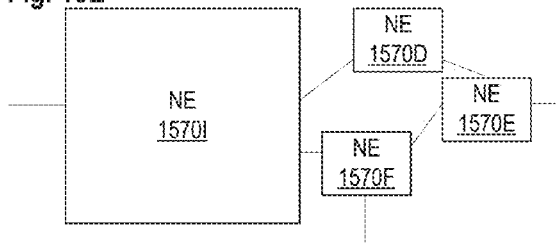
FIG. 15E illustrates the simple case of where each of the NDs implements a single NE, but a centralized control plane has abstracted multiple of the NEs in different NDs into (to represent) a single NE in one of the virtual network(s), according to some embodiments of the invention.
Figure 15F:
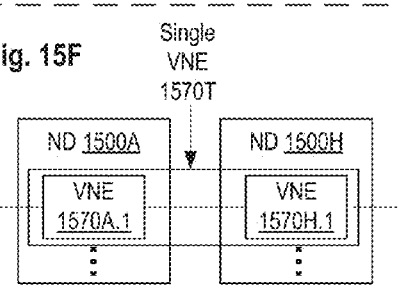
FIG. 15F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 15E and 15F respectively illustrate exemplary abstractions of NEs and VNEs that the network controller 1578 may present as part of different ones of the virtual networks 1592. FIG. 15E illustrates the simple case of where each of the NDs 1500A-H implements a single NE 1570A-H (see FIG. 15D), but the centralized control plane 1576 has abstracted multiple of the NEs in different NDs (the NEs 1570A-C and G-H) into (to represent) a single NE 1570I in one of the virtual network(s) 1592 of FIG. 15D, according to some embodiments of the invention. FIG. 15E shows that in this virtual network, the NE 1570I is coupled to NE 1570D and 1570F, which are both still coupled to NE 1570E.

FIG. 15F illustrates a case where multiple VNEs (VNE 1570A.1 and VNE 1570H.1) are implemented on different NDs (ND 1500A and ND 1500H) and are coupled to each other, and where the centralized control plane 1576 has abstracted these multiple VNEs such that they appear as a single VNE 1570T within one of the virtual networks 1592 of FIG. 15D, according to some embodiments of the invention. Thus, the abstraction of a NE or VNE can span multiple NDs.

While some embodiments of the invention implement the centralized control plane 1576 as a single entity (e.g., a single instance of software running on a single electronic device), alternative embodiments may spread the functionality across multiple entities for redundancy and/or scalability purposes (e.g., multiple instances of software running on different electronic devices).

Figure 16:
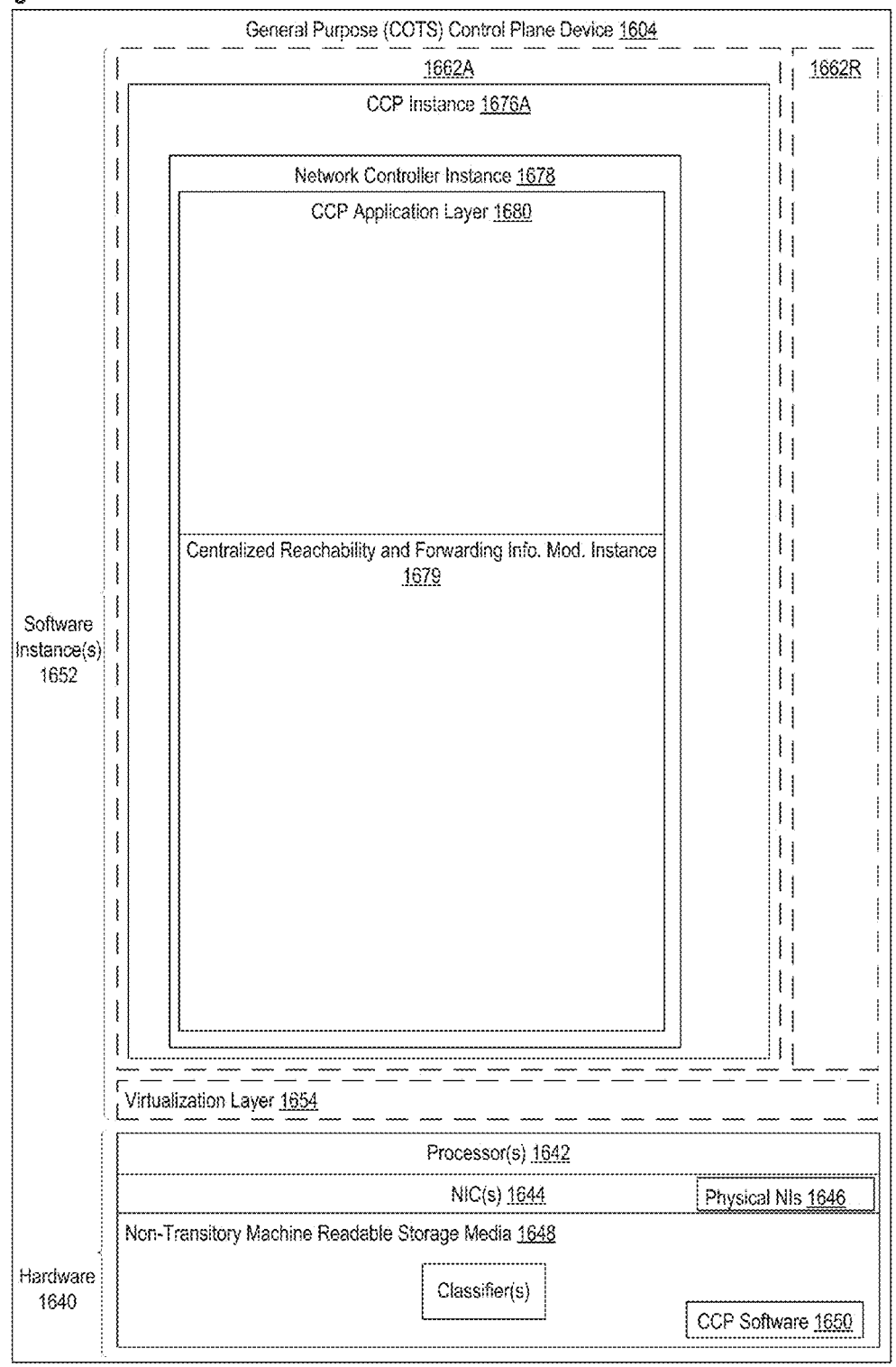
FIG. 16 illustrates a general purpose control plane device with centralized control plane (CCP) software), according to some embodiments of the invention.

Similar to the network device implementations, the electronic device(s) running the centralized control plane 1576, and thus the network controller 1578 including the centralized reachability and forwarding information module 1579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 16 illustrates, a general purpose control plane device 1604 including hardware 1640 comprising a set of one or more processor(s) 1642 (which are often COTS processors) and network interface controller(s) 1644 (NICs; also known as network interface cards) (which include physical NIs 1646), as well as non-transitory machine readable storage media 1648 having stored therein centralized control plane (CCP) software 1650.

In embodiments that use compute virtualization, the processor(s) 1642 typically execute software to instantiate a virtualization layer 1654 and software container(s) 1662A-R (e.g., with operating system-level virtualization, the virtualization layer 1654 represents the kernel of an operating system (or a shim executing on a base operating system) that allows for the creation of multiple software containers 1662A-R (representing separate user space instances and also called virtualization engines, virtual private servers, or jails) that may each be used to execute a set of one or more applications; with full virtualization, the virtualization layer 1654 represents a hypervisor (sometimes referred to as a virtual machine monitor (VMM)) or a hypervisor executing on top of a host operating system, and the software containers 1662A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 1650 (illustrated as CCP instance 1676A) is executed within the software container 1662A on the virtualization layer 1654. In embodiments where compute virtualization is not used, the CCP instance 1676A on top of a host operating system is executed on the "bare metal" general purpose control plane device 1604. The instantiation of the CCP instance 1676A, as well as the virtualization layer 1654 and software containers 1662A-R if implemented, are collectively referred to as software instance(s) 1652.

In some embodiments, the CCP instance 1676A includes a network controller instance 1678. The network controller instance 1678 includes a centralized reachability and forwarding information module instance 1679 (which is a middleware layer providing the context of the network controller 1578 to the operating system and communicating with the various NEs), and an CCP application layer 1680 (sometimes referred to as an application layer) over the middleware layer (providing the intelligence required for various network operations such as protocols, network situational awareness, and user-interfaces). At a more abstract level, this CCP application layer 1680 within the centralized control plane 1576 works with virtual network view(s) (logical view(s) of the network) and the middleware layer provides the conversion from the virtual networks to the physical view.

The centralized control plane 1576 transmits relevant messages to the data plane 1580 based on CCP application layer 1680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1580 may receive different messages, and thus different forwarding information. The data plane 1580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1580, the packet (or a subset of the packet header and content) is typically forwarded to the centralized control plane 1576. The centralized control plane 1576 will then program forwarding table entries into the data plane 1580 to accommodate packets belonging to the flow of the unknown packet. Once a specific forwarding table entry has been programmed into the data plane 1580 by the centralized control plane 1576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a first network device, the method comprising:
   in response to receiving a packet, determining whether the packet has been classified;
   in response to determining the packet has not been classified, classifying the packet to determine a class to which the packet belongs, wherein the class identifies a set of one or more markers that are to be included as part of packets belonging to the class;
   marking the packet with a first marker selected from the set of one or more markers, wherein the first marker includes an offset value indicating a location in the first marker where a timestamp is to be inserted; and
   forwarding the marked packet.

2. The method of claim 1, wherein the first marker further includes a color of the packet and a time interval, the time interval indicating a frequency of when packets belonging to the class are marked with the first marker.

3. The method of claim 1, further comprising:
marking the packet with a second marker selected from the set of one or more markers, wherein the second marker includes a key performance indicator (KPI) indicating whether the timestamp is to be inserted in the first marker at the location indicated by the offset value.

4. The method of claim 1, wherein the first marker further includes a start value indicating a first location in the packet and a stop value indicating a second location in the packet, wherein bytes in the packet that are between the first location and the second location are to be collected.

5. A first network device, the first network device comprising:
a set of one or more processors; and
a non-transitory machine-readable storage medium containing code, which when executed by the set of one or more processors, causes the first network device to:
in response to receiving a packet, determine whether the packet has been classified;
in response to determining the packet has not been classified, classify the packet to determine a class to which the packet belongs, wherein the class identifies a set of one or more markers that are to be included as part of packets belonging to the class;
mark the packet with a first marker selected from the set of one or more markers, wherein the first marker includes an offset value indicating a location in the first marker where a timestamp is to be inserted; and
forward the marked packet.

6. The first network device of claim 5, wherein the first marker further includes a color of the packet and a time interval, the time interval indicating a frequency of when packets belonging to the class are marked with the first marker.

7. The first network device of claim 5, wherein the non-transitory machine-readable storage medium further contains code, which when executed by the set of one or more processors, causes the first network device to:
mark the packet with a second marker selected from the set of one or more markers, wherein the second marker includes a key performance indicator (KPI) indicating whether the timestamp is to be inserted in the first marker at the location indicated by the offset value.

8. The first network device of claim 5, wherein the first marker further includes a start value indicating a first location in the packet and a stop value indicating a second location in the packet, wherein bytes in the packet that are between the first location and the second location are to be collected.

9. A non-transitory machine-readable storage medium having computer code stored therein, which when executed by a set of one or more processors of a first network device, causes the first network device to perform operations comprising:
in response to receiving a packet, determining whether the packet has been classified;
in response to determining the packet has not been classified, classifying the packet to determine a class to which the packet belongs, wherein the class identifies a set of one or more markers that are to be included as part of packets belonging to the class;
marking the packet with a first marker selected from the set of one or more markers, wherein the first marker includes an offset value indicating a location in the first marker where a timestamp is to be inserted; and
forwarding the marked packet.

10. The non-transitory machine-readable storage medium of claim 9, wherein the first marker further includes a color of the packet and a time interval, the time interval indicating a frequency of when packets belonging to the class are marked with the first marker.

11. The non-transitory machine-readable storage medium of claim 9, further comprising:
marking the packet with a second marker selected from the set of one or more markers, wherein the second marker includes a key performance indicator (KPI) indicating whether the timestamp is to be inserted in the first marker at the location indicated by the offset value.

12. The non-transitory machine-readable storage medium of claim 9, wherein the first marker further includes a start value indicating a first location in the packet and a stop value indicating a second location in the packet, wherein bytes in the packet that are between the first location and the second location are to be collected.

13. A method in a first network device, the method comprising:
in response to receiving a packet, determining whether the packet has been marked with a marker;
determining the packet has been marked with a first marker, wherein the first marker includes an offset value indicating a location in the first marker where a timestamp is to be inserted; and
in response to determining the packet has been marked with the first marker, performing a set of one or more operations required by the first marker, wherein performing the set of operations includes inserting the timestamp into the first marker at the location indicated by the offset value.

14. The method of claim 13, wherein performing the set of one or more operations further comprises:
updating the offset value by adding the offset value with a size of the inserted timestamp.

15. The method of claim 13, further comprising:
determining the packet has been marked with a second marker that includes a key performance indicator (KPI) indicating whether the timestamp is to be inserted in the first marker at the location indicated by the offset value, and wherein performing the set of one or more operations further comprises:
determining to insert the timestamp in the first marker in response to determining the KPI indicates the timestamp is to be inserted.

16. The method of claim 13, wherein the first marker further includes a start value indicating a first location in the packet and a stop value indicating a second location in the packet, and wherein performing the set of one or more operations further comprises:
collecting bytes in the packet that are between the first location and the second location.

17. A first network device, the first network device comprising:
a set of one or more processors; and
a non-transitory machine-readable storage medium containing code, which when executed by the set of one or more processors, causes the first network device to:
in response to receiving a packet, determine whether the packet has been marked with a marker;

determine the packet has been marked with a first marker, wherein the first marker includes an offset value indicating a location in the first marker where a timestamp is to be inserted; and in response to determining the packet has been marked with the first marker, perform a set of one or more operations required by the first marker, wherein the set of operations include inserting the timestamp into the first marker at the location indicated by the offset value.

18. The first network device of claim 17, wherein the first network device, to perform the set of one or more operations, is further to:

update the offset value by adding the offset value with a size of the inserted timestamp.

19. The first network device of claim 17, wherein the non-transitory machine-readable storage medium further contains code, which when executed by the set of one or more processors, causes the first network device to:

determine that the packet has been marked with a second marker that includes a key performance indicator (KPI) indicating whether the timestamp is to be inserted in the first marker at the location indicated by the offset value, and wherein performing the set of one or more operations further comprises:

determining to insert the timestamp in the first marker in response to determining the KPI indicates the timestamp is to be inserted.

20. The first network device of claim 17, wherein the first marker further includes a start value indicating a first location in the packet and a stop value indicating a second location in the packet, and wherein the first network device, to perform the set of one or more operations, is to:

collect bytes in the packet that are between the first location and the second location.

21. A non-transitory machine-readable storage medium having computer code stored therein, which when executed by a set of one or more processors of a first network device, causes the first network device to perform operations comprising:

in response to receiving a packet, determining whether the packet has been marked with a marker;

determining the packet has been marked with a first marker, wherein the first marker includes an offset value indicating a location in the first marker where a timestamp is to be inserted; and in response to determining the packet has been marked with the first marker, performing a set of one or more operations required by the first marker, wherein the set of operations include inserting the timestamp into the first marker at the location indicated by the offset value.

22. The non-transitory machine-readable storage medium of claim 21, wherein performing the set of one or more operations further comprises:

updating the offset value by adding the offset value with a size of the inserted timestamp.

23. The non-transitory machine-readable storage medium of claim 21, wherein the operations further comprise:

determining that the packet has been marked with a second marker that includes a key performance indicator (KPI) indicating whether the timestamp is to be inserted in the first marker at the location indicated by the offset value, and wherein performing the set of one or more operations further comprises:

determining to insert the timestamp in the first marker in response to determining the KPI indicates the timestamp is to be inserted.

24. The non-transitory machine-readable storage medium of claim 21, wherein the first marker further includes a start value indicating a first location in the packet and a stop value indicating a second location in the packet, and wherein performing the set of one or more operations comprises:

collecting bytes in the packet that are between the first location and the second location.

* * * * *